May 31, 1966      K. KVEIM      3,254,203
NUMERICAL CURVE GENERATOR, SUCH AS FOR MACHINE TOOL SYSTEMS
Filed Aug. 28, 1962      12 Sheets-Sheet 1
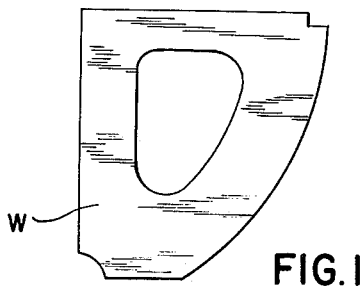
FIG.1
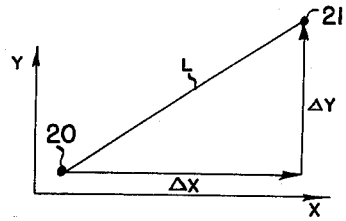
FIG.2ᵃ
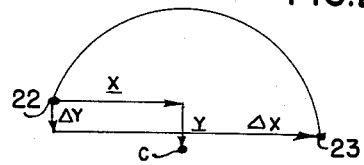
FIG.2ᵇ
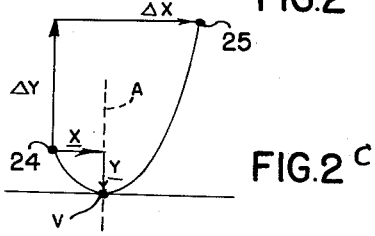
FIG.2ᶜ
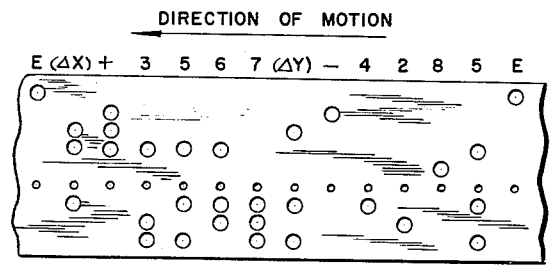
FIG.3
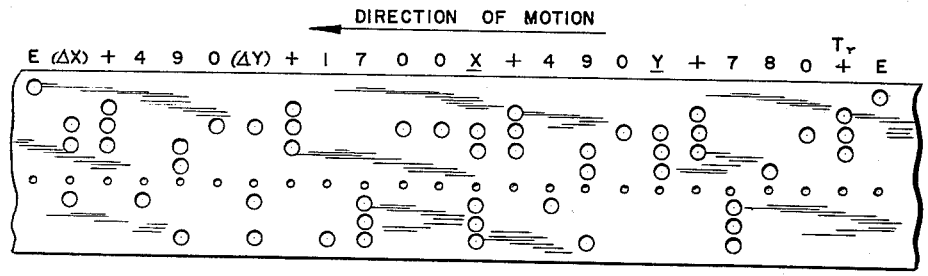
FIG.4
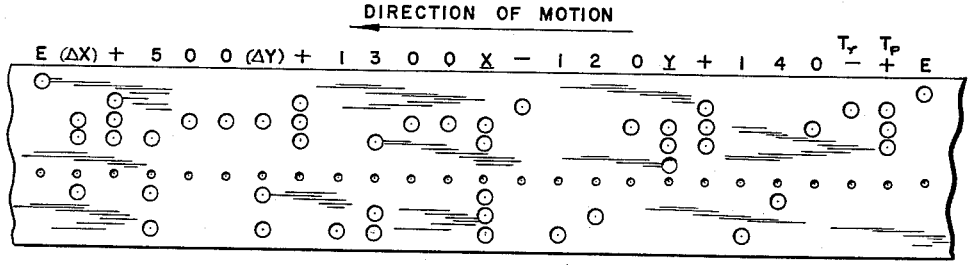
FIG.5
INVENTOR.
KJELL KVEIM
BY
RICHEY, McNENNY & FARRINGTON
William J. Flynn
ATTORNEYS May 31, 1966     K. KVEIM     3,254,203
NUMERICAL CURVE GENERATOR, SUCH AS FOR MACHINE TOOL SYSTEMS
Filed Aug. 28, 1962     12 Sheets-Sheet 2
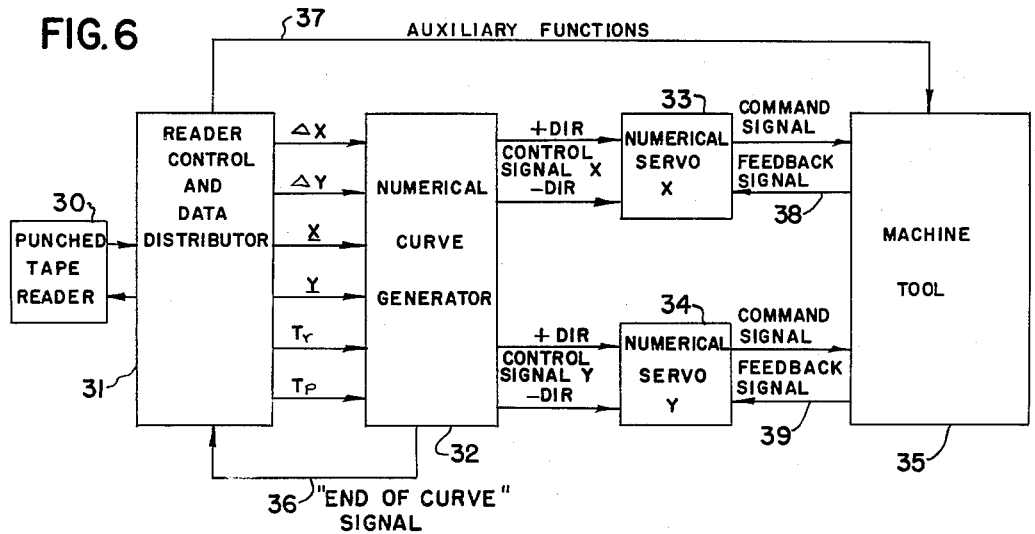
FIG. 6
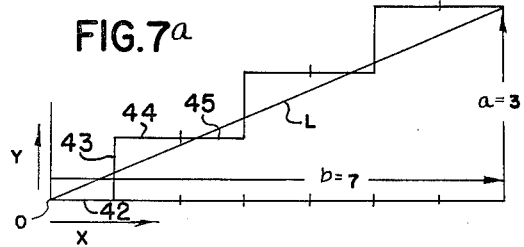
FIG. 7a
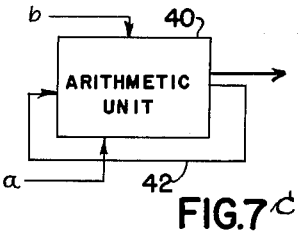
FIG. 7c
| OPERATION IN ARITHMETIC UNIT | NUMBER IN ARITHMETIC UNIT | $n_a$ | $n_b$ | X | Y |
|---|---|---|---|---|---|
| | 0 | | | 0 | 0 |
| SUBTRACT $a$ | −3 | ✓ | | 1 | 0 |
| ADD $b$ | +4 | | ✓ | 1 | 1 |
| SUBTRACT $a$ | +1 | ✓ | | 2 | 1 |
| SUBTRACT $a$ | −2 | ✓ | | 3 | 1 |
| ADD $b$ | +5 | | ✓ | 3 | 2 |
| SUBTRACT $a$ | +2 | ✓ | | 4 | 2 |
| SUBTRACT $a$ | −1 | ✓ | | 5 | 2 |
| ADD $b$ | +6 | | ✓ | 5 | 3 |
| SUBTRACT $a$ | +3 | ✓ | | 6 | 3 |
| SUBTRACT $a$ | 0 | ✓ | | 7 | 3 |
FIG. 7b
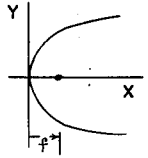
FIG. 7d
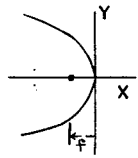
FIG. 7e
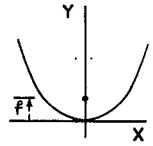
FIG. 7f
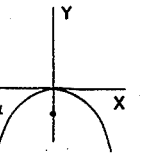
FIG. 7g
INVENTOR.
KJELL KVEIM
BY
RICHEY, MCNENNY & FARRINGTON
*William J. Flynn*
ATTORNEYS

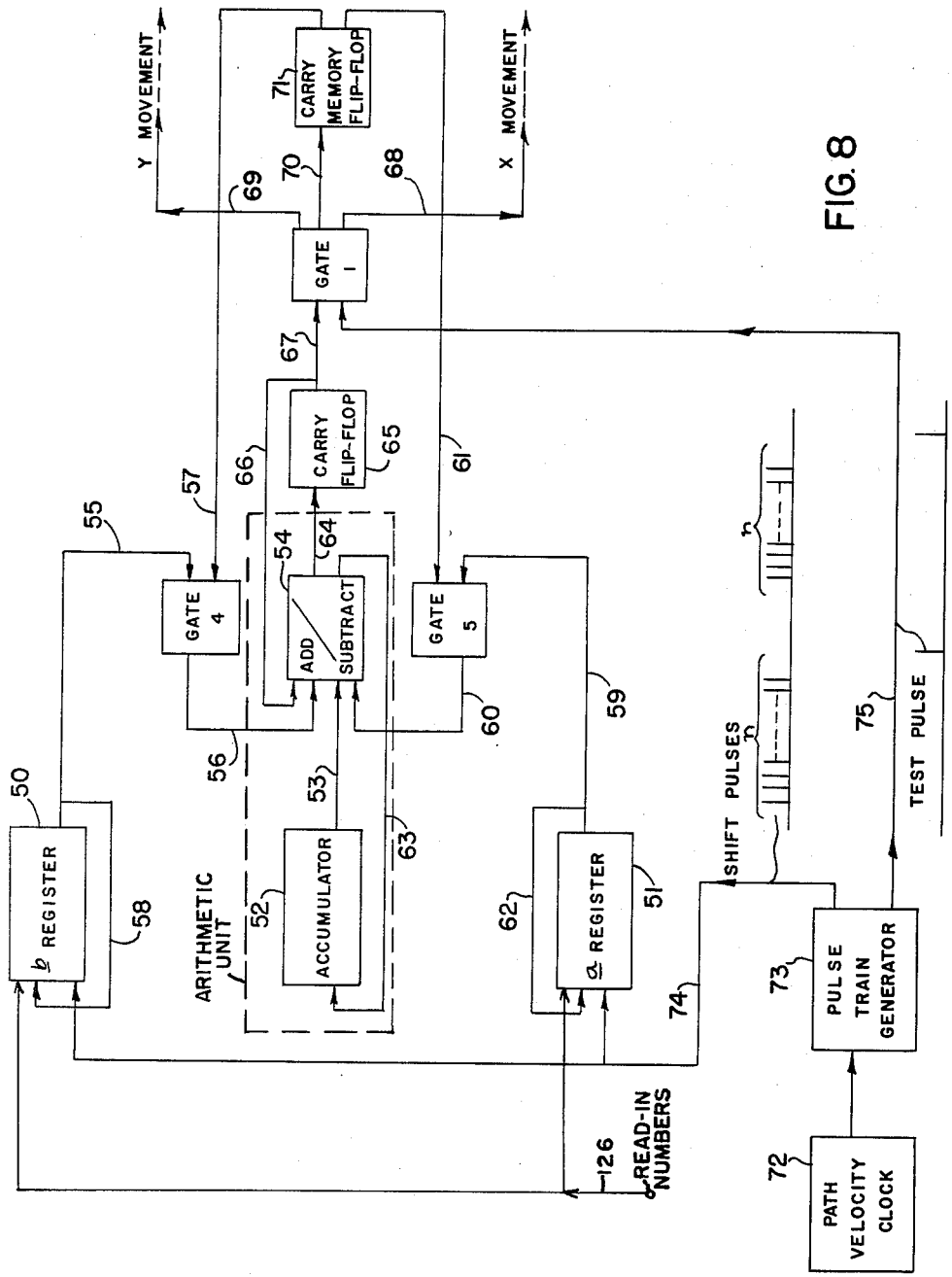

May 31, 1966  K. KVEIM  3,254,203
NUMERICAL CURVE GENERATOR, SUCH AS FOR MACHINE TOOL SYSTEMS
Filed Aug. 28, 1962  12 Sheets-Sheet 7

INVENTOR.
KJELL KVEIM
BY RICHEY, McNENNY & FARRINGTON
*William J. Flynn*
ATTORNEYS May 31, 1966     K. KVEIM     3,254,203
NUMERICAL CURVE GENERATOR, SUCH AS FOR MACHINE TOOL SYSTEMS
Filed Aug. 28, 1962                                    12 Sheets-Sheet 8

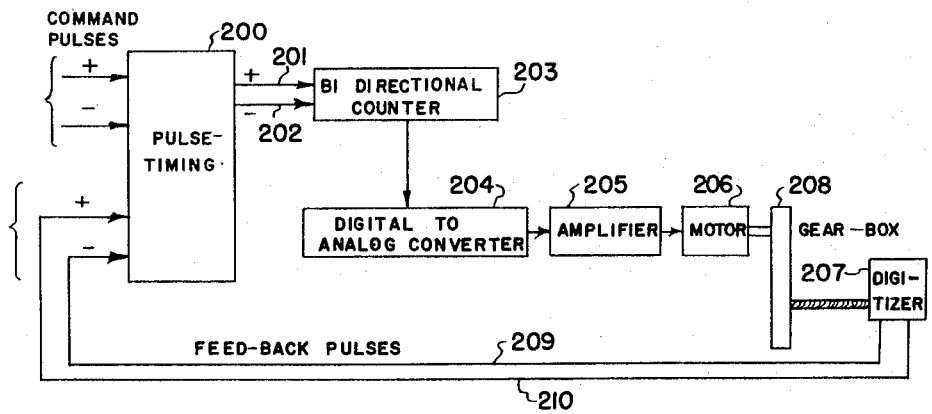

SIGN MODIFICATION FOR ZERO TEST IN THE REGISTER $\Delta X = 0$ :

| WHEN SIGN Y | $T_r$ | SET SIGN $\Delta X$ TO: |
|---|---|---|
| + | + | − |
| − | − | − |
| + | − | + |
| − | + | + |

$\Delta Y = 0$ :

| WHEN SIGN X | $T_r$ | SET SIGN $\Delta Y$ TO: |
|---|---|---|
| + | − | − |
| − | + | − |
| + | + | + |
| − | − | + |

$\underline{X} = 0$ :

| WHEN SIGN Y | $T_r$ | SET SIGN $\underline{\frac{X}{0}}$ TO |
|---|---|---|
| + | − | + |
| − | + | + |
| + | + | − |
| − | − | − |

$\underline{Y} = 0$ :

| WHEN SIGN X | $T_r$ | SET SIGN $\underline{Y}$ TO: |
|---|---|---|
| + | + | + |
| − | − | + |
| + | − | − |
| − | + | − |

BOOLEAN EXPRESSIONS FOR SIGN SETTING AND MODIFICATION
$s \sim +,\ \bar{s} \sim -$

SET:  REFERRING TO SETTING DURING
      THE "READ IN" PHASE $S_{\Delta X}$ = ADDR. $\Delta X \cdot S$
$\overline{S}_{\Delta X}$ = ADDR. $\Delta X \cdot \bar{S}$
$S_{\Delta Y}$ = ADDR. $\Delta Y \cdot S$
$\overline{S}_{\Delta Y}$ = ADDR. $\Delta Y \cdot \bar{S}$
$S_X$ = ADDR. $\Delta Y \cdot \bar{S}$+ADDR. $X \cdot S$
$\overline{S}_X$ = ADDR. $\Delta Y \cdot S$+ADDR. $X \cdot \bar{S}$
$S_Y$ = (ADDR.$\Delta X$ + ADDR. $Y$)$\cdot \bar{S}$
$\overline{S}_Y$ = (ADDR.$\Delta X$ + ADDR. $Y$)$\cdot S$
$T_r$ = ADDR. $T_r \cdot \bar{S}$
$\overline{T}_r$ = ADDR. $T_r \cdot S$
$T_P$ = ADDR. $T_P \cdot S$
$\overline{T}_P$ = ADDR. $T_P \cdot \bar{S}$

MODIFICATION OF ZERO TEST
DURING THE "GENERATE" PHASE

+ ($\Delta X=0$) ($a \cdot \bar{S}Y + \bar{a} \cdot S Y$)
+ ($\Delta X=0$) ($a \cdot S Y + \bar{a} \cdot \bar{S}Y$)
+ ($\Delta Y=0$) ($a \cdot \underline{S}X + \bar{a} \cdot \underline{S}X$)
+ ($\Delta Y=0$) ($a \cdot \underline{S}X + \bar{a} \cdot S X$)
+ ($X=0$) ($\bar{a} \cdot \bar{S}Y + a \cdot \bar{S}Y$)
+ ($X=0$) ($\bar{a} \cdot \underline{S}Y + a \cdot S Y$)
+ ($Y=0$) ($a \cdot \underline{S}X + \bar{a} \cdot \bar{S}X$)
+ ($Y=0$) ($a \cdot \bar{S}X + \bar{a} \cdot S X$)

INVENTOR.
KJELL KVEIM
BY William J. Flynn
ATTORNEYS

OUTPUT SIGNALS VS SIGN COMBINATIONS

| | SIGN ΔX | SIGN ΔY | SIGN X | SIGN Y | SIGN Tr | SIGN Tp | ΔX | ΔY | X | Y | X-MOV. | Y-MOV. |
|---|---|---|---|---|---|---|---|---|---|---|---|---|
| 1 | + | + | + | + | − | +/− | ADD. | SUB. | ADD. | SUB. | NEG. | POS. |
| 2 | + | + | + | + | + | +/− | SUB. | ADD. | SUB. | ADD. | POS. | NEG. |
| 3 | − | + | + | + | − | +/− | SUB. | SUB. | ADD. | SUB. | NEG. | POS. |
| 4 | − | + | + | + | + | +/− | ADD. | ADD. | SUB. | ADD. | POS. | NEG. |
| 5 | − | − | − | − | − | +/− | ADD. | SUB. | ADD. | SUB. | POS. | NEG. |
| 6 | − | − | − | − | + | +/− | SUB. | ADD. | SUB. | ADD. | NEG. | POS. |
| 7 | − | + | − | − | − | +/− | SUB. | SUB. | ADD. | SUB. | POS. | NEG. |
| 8 | − | + | − | − | + | +/− | ADD. | ADD. | SUB. | ADD. | NEG. | POS. |
| 9 | − | − | + | − | − | +/− | SUB. | SUB. | SUB. | ADD. | POS. | POS. |
| 10 | − | − | + | − | + | +/− | ADD. | ADD. | ADD. | SUB. | NEG. | NEG. |
| 11 | − | − | − | + | − | +/− | SUB. | SUB. | SUB. | ADD. | NEG. | NEG. |
| 12 | − | − | − | + | + | +/− | ADD. | ADD. | ADD. | SUB. | POS. | POS. |
| 13 | + | − | + | − | − | +/− | SUB. | ADD. | SUB. | ADD. | POS. | POS. |
| 14 | + | − | + | − | + | +/− | ADD. | SUB. | ADD. | SUB. | NEG. | NEG. |
| 15 | + | + | + | − | − | +/− | SUB. | SUB. | SUB. | ADD. | POS. | POS. |
| 16 | + | + | + | − | + | +/− | ADD. | ADD. | ADD. | SUB. | NEG. | NEG. |
| 17 | + | − | + | + | − | +/− | ADD. | ADD. | ADD. | SUB. | NEG. | POS. |
| 18 | + | − | + | + | + | +/− | SUB. | SUB. | SUB. | ADD. | POS. | NEG. |
| 19 | + | − | − | − | − | +/− | SUB. | SUB. | ADD. | SUB. | POS. | NEG. |
| 20 | + | − | − | − | + | +/− | ADD. | ADD. | SUB. | ADD. | NEG. | POS. |
| 21 | − | + | − | + | − | +/− | SUB. | ADD. | SUB. | ADD. | NEG. | NEG. |
| 22 | − | + | − | + | + | +/− | ADD. | SUB. | ADD. | SUB. | POS. | POS. |
| 23 | + | + | − | + | − | +/− | ADD. | ADD. | SUB. | ADD. | NEG. | NEG. |
| 24 | + | + | − | + | + | +/− | SUB. | SUB. | ADD. | SUB. | POS. | POS. |

BOOLEAN EXPRESSIONS FOR THE VALUE OF THE OUTPUT SIGNALS OF THE SIGN LOGIC IN THE ABOVE TABLE

SETTING:
$a = Tr$
$b = S_{\Delta X} \cdot \bar{S}_Y + \bar{S}_{\Delta X} \cdot S_Y$
$c = S_{\Delta Y} \cdot \bar{S}_X + \bar{S}_{\Delta Y} \cdot S_X$
$d = S_X \cdot \bar{S}_Y + \bar{S}_X \cdot S_Y$ WE GET
$ADD_{\Delta X} = \bar{a}\bar{b} + ab$
$SUB_{\Delta X} = \overline{ADD_{\Delta X}} = \bar{a}b + a\bar{b}$
$ADD_{\Delta Y} = \bar{a}c + a\bar{c}$
$SUB_{\Delta Y} = \overline{ADD_{\Delta Y}} = \bar{a}\bar{c} + ac$
$SUB\ X, ADD\ Y = \bar{a}d + a\bar{d}$
$ADD\ X, SUB\ Y = \overline{SUB\ X, ADD\ Y} = \bar{a}\bar{d} + ad$

SETTING M = ACCUMULATOR CARRY MEMORY, M∼+, M∼−, GIVES

X POS. $= (\bar{a} \cdot \bar{S}_Y + a \cdot S_Y) M$
X NEG. $= (\bar{a} \cdot S_Y + a \cdot \bar{S}_Y) M$
Y POS. $= (\bar{a} \cdot S_X + a \cdot \bar{S}_X) \bar{M}$
Y NEG. $= (\bar{a} \cdot \bar{S}_X + a \cdot S_X) \bar{M}$

FIG. 14

INVENTOR.
KJELL KVEIM

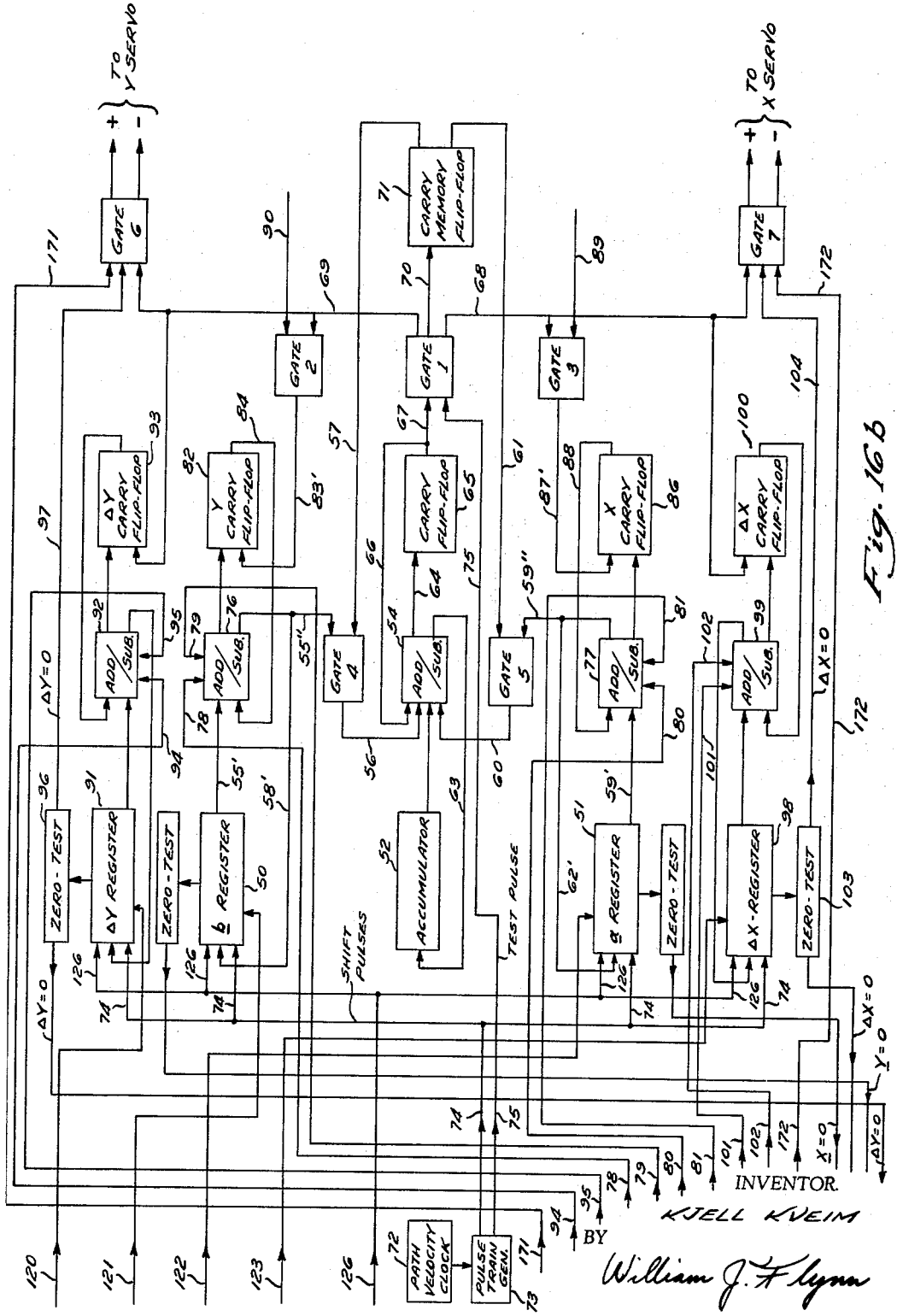

May 31, 1966 K. KVEIM 3,254,203
NUMERICAL CURVE GENERATOR, SUCH AS FOR MACHINE TOOL SYSTEMS
Filed Aug. 28, 1962 12 Sheets-Sheet 12

INVENTOR.
KJELL KVEIM
BY
William J. Flynn
ATTORNEYS

United States Patent Office 3,254,203
Patented May 31, 1966

3,254,203
NUMERICAL CURVE GENERATOR, SUCH AS FOR MACHINE TOOL SYSTEMS
Kjell Kveim, Oslo, Norway, assignor to Sentralinstitutt for Industriell Forskning, Oslo, Norway
Filed Aug. 28, 1962, Ser. No. 219,982
Claims priority, application Norway, Aug. 31, 1961, 141,326
17 Claims. (Cl. 235—152)

This invention relates to a numerical curve generator. A principal use of the present invention is in the automatic control of a machine tool, although it may be used for other purposes, also.

It is an object of this invention to provide a novel and improved numerical curve generator.

It is also an object of this invention to provide such a curve generator which is capable of generating conic section curves, such as parabolic curves, circular arcs and straight lines.

A further object of this invention is to provide such a curve generator which is particularly advantageous for controlling the operation of a machine tool.

Additional objects and advantages of this invention will be apparent from the following detailed description of a presently-preferred embodiment thereof, shown in the accompanying drawings.

In the drawings:

FIG. 1 shows a work piece of the type which may be machined by a machine tool under the control of the present curve generator;

FIG. 2a shows a straight line of a predetermined slope which may be generated by the present curve generator;

FIGS. 2b and 2c show, respectively, a circular arc and a parabolic curve which may be generated by the present curve generator;

FIG. 3 is a plan view of a section of a punched tape encoded with the parameters of a sloping straight line;

FIG. 4 is a plan view of a section of a punched tape encoded with the parameters of a circular arc;

FIG. 5 is a plan view of a section of a punched tape encoded with the parameters of a parabolic curve;

FIG. 6 is a schematic block diagram of a machine tool control system which embodies the present invention;

FIG. 7a is a Cartesian coordinate graph showing the incremental movements involved in generating a line which substantially follows the sloping line L in accordance with the present invention;

FIG. 7b is a table showing the arithmetic operations involved in generating this line;

FIG. 7c is a schematic diagram showing the arithmetic unit for generating this line;

FIGS. 7d, 7e, 7f and 7g show the same parabola with four different axial orientations, each having the parabola axis coincident with either the X or Y coordinate axis and with the vertex of the parabola at the origin of the X and Y coordinate axes;

FIG. 8 is a schematic block diagram showing components of the present curve generator which operate during the generation of a straight line;

FIG. 13 is a schematic diagram of the servo motor arrangement for moving a machine tool in one coordinate direction under the control of the present curve generator;

FIG. 14 shows the operation of the sign logic block in the present control system;

FIG. 15 shows the operation of the sign-change logic block associated with the zero-test circuitry in the present control system;

FIGURES 16a and 16b show a complete schematic circuit diagram of the present control system, including the reader control and data distributor of FIG. 12 and the complete curve generator of FIG. 11.

Figure 9:
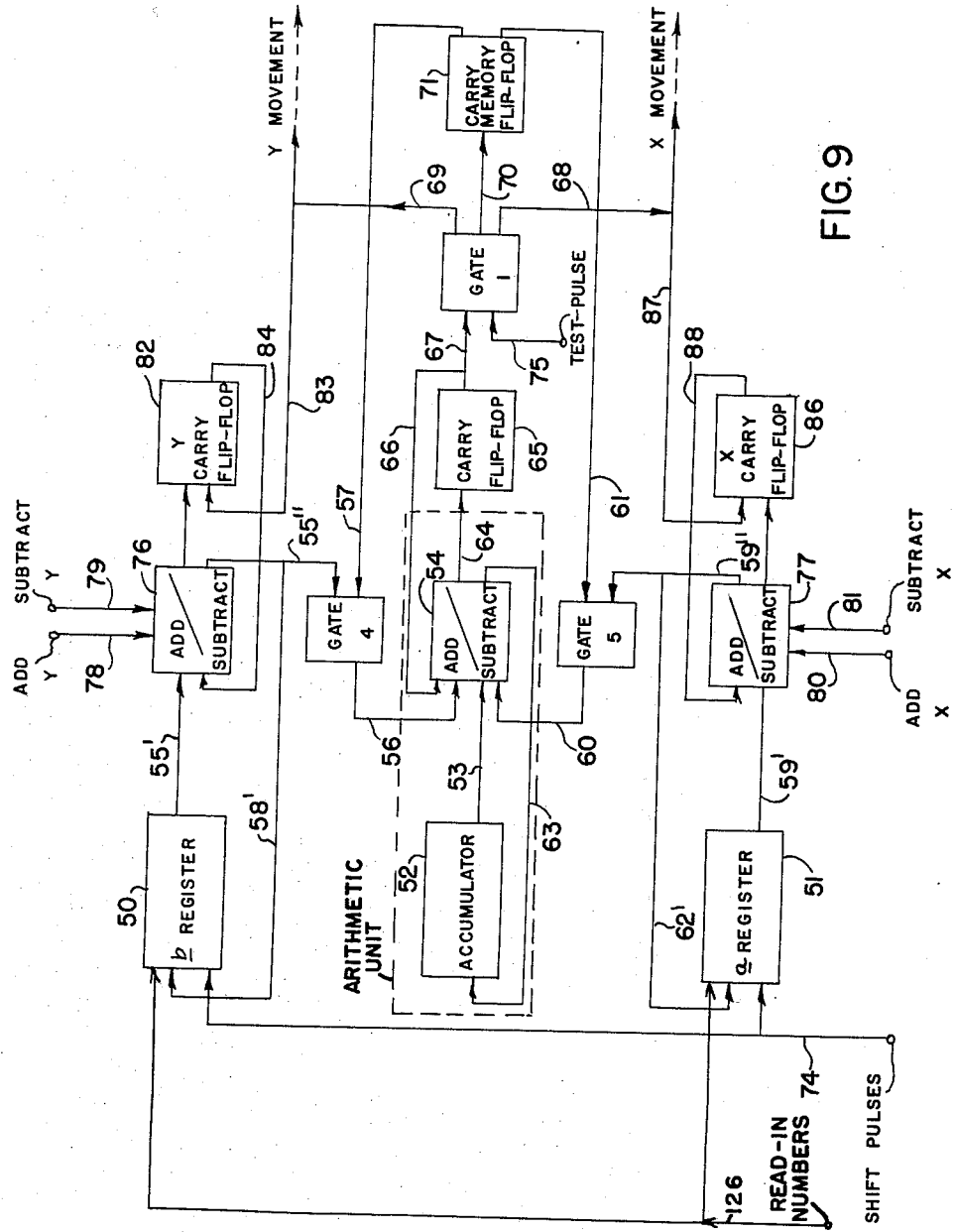
FIG. 9 is a similar view showing components of the curve generator which operate during the generation of a circular arc.

In FIG. 1, a finished workpiece W is shown as an example of the type of workpiece which may be machined on a machine tool controlled numerically by the arrangement of the present invention. Such a workpiece has a number of different "curves" on its periphery. (As used herein, the term "curves" includes straight lines as well as lines which are not straight.)

Commonly when such a workpiece is drawn, curves other than straight lines and circular arcs will be empirical curves with are not exactly mathematical curves. Usually such empirical curves do not fit circular arcs closely, but in most instances they are not greatly different from parabolic curves. Therefore, a numerical control system which is capable of generating parabolic curves, as well as well as circular arcs and straight lines, will be able to substantially generate all of the curves required to produce the workpiece. That is, the purely mathematical curves generated by the curve generator will substantially fit all of the workpiece curves, whether mathematical curves or empirical curves.

Referring to FIG. 2a, using Cartesian coordinates, any straight line L can be expressed mathematically by the coordinate differences, $\Delta X$ and $\Delta Y$, between the starting point 20 and the end point 21 of the line. The magnitudes of $\Delta X$ and $\Delta Y$ determine the length of line L and the respective signs of $\Delta X$ and $\Delta Y$ determine its direction.

Referring to FIG. 2b, any circular arc can be expressed mathematically by the parameters $\Delta X$ and $\Delta Y$, which are the differences in the "X" and "Y" directions between the starting point 22 and the end point 23 of the curve, the coordinate distances $\underline{X}$ and $\underline{Y}$ from the starting point 22 to the center C of the circle, and a parameter, $T_r$, stated as "+" or "−," which gives the direction of rotation of the curve from the starting point 22 to the end point 23. The parameters $\Delta X$, $\Delta Y$, $\underline{X}$ and $\underline{Y}$ will each be expressed as a number and a sign, + or −. At the starting point 22, a line tangent to the circle has a slope $(a/b)$ equal to $\underline{X}/\underline{Y}$.

FIG. 2c shows a parabolic curve having a starting point 24 and an end point 25. This curve can be expressed mathematically by the coordinate differences, $\Delta X$ and $\Delta Y$, between the starting point 24 and the end point 25, the coordinate distance between the starting point 24 and the axis A of the parabola (in this instance, the X coordinate distance, designated $\underline{X}$), the summit radius of the parabola (that is, the other coordinate distance between the starting point 24 and the vertex V of the parabola— in this instance, the Y coordinate distance, designated $\underline{Y}$), the direction of rotation $(T_r = +$ or $-)$ of the parabolic curve from its starting point 24 to its end point, and an additional parameter, $T_p$ (expressed as + or −) which indicates whether the axis A is parallel to the Y axis or parallel to the X axis. In FIG. 2c, the axis A is shown parallel to the Y axis. The parameters $\Delta X$, $\Delta Y$, $\underline{X}$ and $\underline{Y}$ are each expressed as a number and a sign (+ or −).

With such parameters encoded on a record medium, such as a punched tape, the curve generator of the present invention can generate a curve which closely follows the corresponding mathematical curve. In the use of the present invention for controlling a machine tool, the mathematical curves which correspond to successive curves to be machined on the workpiece are recorded in succession on the record medium, so that the machine tool will carry out in succession the machining operations necessary to produce the respective curves.

FIG. 3 shows a portion of a punched paper tape having encoded thereon the parameters for a straight line. The tape is an eight-row tape encoded according to the Electronic Industries Association standard code. The numbers are not recorded as true binary numbers, but in binary-coded decimal form. That is, each successive digit in the decimal number is recorded in binary form. In the particular example shown in FIG. 3, $\Delta X$ is $+3567$ and $\Delta Y$ is $-4285$. The next encoded symbol "E" designates the end of the data block on the tape.

FIG. 4 shows a portion of a punched tape having the parameters of a circular arc encoded thereon in binary-encoded decimal form. As shown, these parameters are: $\Delta X = +490$; $\Delta Y = +1700$; $\underline{X} = +490$; $\underline{Y} = +780$; and $T_r = +$.

FIG. 5 shows a portion of a punched tape similarly encoded with the parameters of a parabolic curve. As shown, these parameters are: $\Delta X = +500$; $\Delta Y = +1300$; $\underline{X} = -120$; $\underline{Y} = +140$; $T_r = -$; and $T_p = +$.

*Outline of control system*

A machine tool numerical control system embodying the numerical curve generator of the present invention is shown in block diagram form in FIG. 6. In general outline, it includes a tape reader 30 for reading successive encoded sections of a punched tape of the type shown in FIGS. 3–5. For each particular curve section, one section at a time, the encoded parameters read from the tape are fed into a reader control and data distributor 31, shown in greater detail in FIG. 12. The individual parameters for that curve section are fed, via correspondingly labelled lines, from the output of the distributor 31 to separate input terminals of a numerical curve generator 32, which is shown complete and in detail in FIG. 11. This curve generator, in response to the input data fed into it, produces control signals for "X" and "Y" servos 33 and 34, which respectively control incremental movements of the machine tool 35 in the X and Y directions.

In this system, the X and Y movements of the machine tool take place separately and not simultaneously. That is, at any instant when the tool is moving in the X direction it does not move in the Y direction, and vice versa.

It will be apparent, therefore, that the tool moves in stair-step fashion, instead of along a continuous curve. However, the individual increments of movement of the tool are so small that the tool follows the desired curve with sufficient accuracy for practical purposes.

The machine tool itself is no part of the present invention and therefore it is not shown in detail. As an illustrative example, the machine tool may be a lathe having a cross slide carriage mounted for movement parallel to one of the coordinate axes, such as the X axis, and a cross slide mounted for movement parallel to the other coordinate axis.

The system of FIG. 6 also includes a feedback network 36 connected from the numerical curve generator back to the reader control and data distributor 31, as explained hereinafter in the description of FIG. 11. When a particular curve, as defined by the parameters read from the tape, has been completed by the curve generator 32, it sends back an "end of curve" signal via line 36 which conditions the reader control and data distributor 31 to begin the reading of the parameters of the next curve encoded on the tape.

Output lines 37 from the reader control and data distributor 31 to the machine tool 35 enable the system to control various auxiliary functions in the machine tool, such as change of spindle speed, coolant supply, etc. The punched tape will have data encoded thereon which specify these functions, and these commands will be routed by the reader control and data distributor 31 to the machine tool. The details of this auxiliary function control are not part of the present invention and therefore will not be described in detail.

Feedback circuits 38 and 39 are connected from the machine tool back to the X and Y servos 33 and 34 for a purpose explained hereinafter.

*Arithmetic operations in curve generator*

In order to facilitate an understanding of the numerical curve generator of the present invention, reference is made to FIGS. 7a, 7b and 7c. The straight line L shown therein has a predetermined slope $(a/b)$, in this instance $3/7$.

In accordance with the present invention, it is desired to produce a movement in stair-step fashion which follows this sloping line L as closely as possible. That is, the successive increments of movement take place separately, either in the X or Y directions, but in such a fashion that they follow as closely as possible the sloping line L.

To achieve this, referring to FIG. 7c, there is provided an arithmetic unit 40 capable of performing either addition or subtraction of $a$ or $b$ with respect to a number stored in the arithmetic unit. The arrangement is such that if the number in the arithmetic unit is positive, the next operation is a subtraction of the number $a$ from this number. If the number in the arithmetic unit is negative, the next operation is an addition of the number $b$.

Assume for purposes of this discussion that the starting number in the arithmetic unit is zero. Also, assume that the presence of zero in the arithmetic unit calls for a subtraction of $a$ as the next operation.

Under these conditions, the first operation is a subtraction of $a$ (3), as shown in the table of FIG. 7b. As described in detail hereinafter, this operation can be arranged to cause a single increment of movement $d$ in the X direction, represented by the line 42 in FIG. 7a, to the coordinate position $X=1$, $Y=0$.

The resultant number, $-3$, is fed back by way of a feedback line 41 to the input of the arithmetic unit 40. Since this number is negative, the next operation in the arithmetic unit will be an addition of $b$ (7) to this number $-3$. This addition operation produces a single increment of movement $d$ in the Y direction, as shown by line 43 in FIG. 7a, to the coordinate position $X=1$, $Y=1$.

The resultant number, $+4$, is fed back to the arithmetic unit and, since it is positive, the next operation in the arithmetic unit will be a subtraction of $a$ from $+4$. This subtraction operation in the arithmetic unit produces a single increment of movement in the X direction, as shown by line 44 in FIG. 7a, to the coordinate position $X=2$, $Y=1$.

The resultant number, $+1$, is fed back to the arithmetic unit and, since it is positive, the next operation in the arithmetic unit will be another subtraction of $a$ from $+1$. This operation produces a single increment of movement in the X direction, as shown by line 45 in FIG. 7a, to the coordinate position $X=3$, $Y=1$.

Successive additions and subtractions occur in the sequence shown in the table of FIG. 7b. These operations in the arithmetic unit produce single increments of movement in the corresponding directions, as shown in FIG. 7a, to the X and Y coordinate positions specified in the table of FIG. 7b.

From FIG. 7a it will be apparent that the actual incremental movements in the X and Y directions follow closely the sloping line L. It should be understood that in actual practice there will be a great number of these incremental movements to produce a given curve and each individual incremental movement will be extremely short, so that the deviation from an exact following of the sloping line L is not harmful as a practical matter.

From FIG. 7b it will be evident that, in the particular example given, the number of subtractions $n_a$ and additions $n_b$ which took place in the arithmetic unit are related to the slope $a/b$ as follows:

$$\frac{n_b}{n_a} = \frac{a}{b} \qquad (1)$$

This relationship can be made to hold true, for practical purposes, for circular and parabolic curves, hyperbolic curves and elliptical curves as explained hereinafter. Therefore, the same arithmetic technique may be used to generate individual incremental X and Y movements which closely follow such curves. In the case of a curve other than a straight line, the numbers $a$ and $b$ will not remain constant throughout the genertaion of the curve because the slope or tangent of the curve will change from one position to the next. This can be taken care of by an appropriate feedback signal after each arithmetic operation, as described in detail hereinafter.

For any curve to be generated, every time the arithmetic unit has a plus number the next operation will be a subtraction of $a$, and every time the arithmetic unit has a negative content the next operation will be an addition of $b$. After a number of subtractions, $n_a$, and additions, $n_b$, have taken place the number in the arithmetic unit will be equal to $n_b b - n_a a$.

This difference must satisfy the following inequality $$-a < (n_b b - n_a a) < b \qquad (2)$$

When the number of incremental movements is large, $n_a$ and $n_b$ will be large numbers, and $n_a a$ and $n_b b$ will be large numbers compared to $a$ and $b$. Since the difference $(n_b b - n_a a)$ is comparatively small, for practical purposes the following equation is valid $$n_a a = n_b b \qquad (3)$$

or $$\frac{n_b}{n_a} = \frac{a}{b} \qquad (4)$$

For all of the different types of curves (straight lines, circles, parabolas, hyperbolas and ellipses) under consideration, the following differential equation holds true $$\frac{dy}{dx} = \frac{a + mx + ny}{b + px + qy} \qquad (5)$$

where each of the coefficients $m$, $n$, $p$ and $q$ may be $+1$, $-1$ or $0$, depending upon the curve type.

For a straight line, $m$, $n$, $p$ and $q$ are all zero.

For a circle, whose equation in integrated form is $$(x+a)^2 + (y-b)^2 = a^2 + b^2 \qquad (6)$$

the coefficients will have the following values:

$$m = +1, \ n = 0, \ p = 0, \ q = -1$$

so that $$\frac{dy}{dx} = \frac{a+x}{b-y} \qquad (7)$$

In the arithmetic operations referred to in connection with FIG. 7c, when a circular arc is being generated the number $a$ will be changed by plus *one* after each positive incremental movement in the X direction and the number $b$ will be changed by minue *one* after each positive incremental movement in the Y direction. That is, *both* of the parameters are changed during the generation of the curve. This is in contrast to the generation of a straight line where both parameters remain constant throughout.

For a parabola, four possible basic situations are possible, as shown by FIGS. 7d, 7e, 7f and 7g. To simplify this discussion, it is assumed in each instance that the vertex of the parabola is at the origin of the X and Y coordinates.

The parabola of FIG. 7d is defined by the equation $$y^2 = 4fx \qquad (8)$$

In this case, $$\frac{dy}{dx} = \frac{2f}{y} \qquad (9)$$

which means that in the general differential Equation 5 $m=0$, $n=0$, $p=0$, $q=+1$, $b=0$, and $a=2f$, so that $$\frac{dy}{dx} = \frac{a}{b+y} \qquad (10)$$

The parabola of FIG. 7e is defined by the equation $$y^2 = -4fx \qquad (11)$$

In this case, $$\frac{dy}{dx} = -\frac{2f}{y} \qquad (12)$$

which means that in Equation 5 $m=0$, $n=0$, $p=0$, $q=-1$, $b=0$, and $a=2f$, so that $$\frac{dy}{dx} = -\frac{a}{b-y} \qquad (13)$$

The parabola of FIG. 7f is defined by the equation $$X^2 = 4fy \qquad (14)$$

In this case, $$\frac{dy}{dx} = \frac{x}{2f} \qquad (15)$$

which means that in Equation 5 $m=+1$, $n=0$, $p=0$, $q=0$, $b=2f$, and $a=0$, so that $$\frac{dy}{dx} = \frac{a+x}{b} \qquad (16)$$

The parabola of FIG. 7g is defined by the equation $$x^2 = -4fy \qquad (17)$$

In this case, $$\frac{dy}{dx} = -\frac{x}{2f} \qquad (18)$$

which means that in Equation 5 $m=-1$, $n=0$, $p=0$, $q=0$, $b=2f$, and $a=0$, so that $$\frac{dy}{dx} = -\frac{a+x}{b} \qquad (19)$$

From Equations 10, 13, 16 and 19 it will be evident that *only one* of the parameters is modified during the generation of the parabola. For example, in the case of FIG. 7f, the parameter $a$, which is zero at the start is modified by the term $mx$, whereas the parameter $b$ remains constant throughout the generation of the parabola. The same relationship holds true for any parabola having its axis parallel to one of the coordinate (X or Y) axes but with its vertex not at the origin.

In the arithmetic operations referred to in connection with FIG. 7c, when the axis of the parabola is parallel to the X coordinate axis, the number $b$ will be changed by *one* after each incremental movement in the Y direction, whereas the number $a$ will remain the same after each incremental movement in the X direction. When the axis of the parabola is parallel to the Y coordinate axis, the number $a$ will changed by *one* after each incremental movement in the X direction, whereas the number $b$ will remain the same after each incremental movement in the Y direction.

*Straight line generator—FIG. 8*

FIG. 8 illustrates in block diagram form the components of the present curve generator which are required to generate the simplest mathematical curve under consideration, i.e., the straight line. These same components plus others, are in the complete curve generator (FIG. 11), which is capable of generating circular arcs, parabolic curves, and other conic section curves, as well as straight lines.

In FIG. 8, the number ΔX (the *b* number in FIG. 7c) for the particular straight line to be generated is stored in the *b* register 50. The number ΔY (the *a* number in FIG. 7c) for this line is stored in the *a* register 51. Preferably, each of these registers is a binary electronic flip-flop register. The arithmetic unit includes an accumulator 52 having its output line 53 connected to an add/subtract unit 54.

The *b* register has an output line 55 leading to a gate, designated "gate 4," and this gate is adapted to pass the ΔX number from the *b* register 50 to a line 56 leading to one input terminal of the add/subtract unit 54. Gate 4 is conditioned by a pulse applied to line 57 to pass the ΔX number to the add/subtract unit 54, as explained hereinafter. When gate 4 is open, the ΔX number is added in the unit 54 to the number in the accumulator 52.

The *b* register 50 also is provided with a feedback line 58 which recirculates the ΔX number from the output of the *b* register back to its input.

The *a* register 51 has an output line 59 leading to a gate, designated "gate 5," and this gate is adapted to pass the ΔY number coming from register 51 to a line 60 leading to another input terminal of the add/subtract unit 54. Gate 5 is conditioned to so pass the ΔY number in response to a pulse on line 61, as explained hereinafter. When gate 5 is open, the ΔY number is subtracted in the unit 54 from the number in the accumulator 52. This subtraction is done by adding the binary complement of the ΔY number to the accumulator member.

The *a* register 51 is also provided with a feedback line 62, which recirculates the ΔY number from the output of the *a* register back to its input.

A feedback line 63 extends from the output of the add/subtract unit 54 back to the input of the accumulator 52. At any instant the number in the accumulator is the result of the preceding additions and subtractions which have taken place in the add/subtract unit 54.

The output of the add/subtract unit 54 is connected through a line 64 to the input of a carry flip-flop 65, which assumes a "one" condition if the number coming from unit 54 is negative and assumes a "zero" condition if the number coming from unit 54 is positive. This is due to the method of subtraction employed in the unit 54 by adding the binary complement of the ΔY number.

A feedback line 66 extends from the output of the carry flip-flop 65 back to the add/subtract unit 54 to condition the latter for the next arithmetic operation, either an addition of ΔX or a subtraction of ΔY, depending upon whether the carry flip-flop 65 is in its "one" or "zero" condition.

An output line 67 from the carry flip-flop 65 leads to a gate, designated "gate 1." When gate 1 is open, as explained hereinafter, a single test pulse from line 75 is passed either to an output line 68 for movement of the tool in the X direction or to an output line 69 for movement of the tool in the Y direction, depending upon whether the carry flip-flop 65 is in its "one" or "zero" condition. Also the value (zero or one) of the carry flip-flop 65 after the addition or subtraction operation, is passed through gate 1 via line 70 to a carry memory flip-flop 71. The previously mentioned lines 57 and 61 extend from the output of the carry memory flip-flop back to gate 4 and gate 5, respectively. The carry memory flip-flop 71 passes a gating signal to one or the other of these gates, depending upon the carry signal which it has received from gate 1.

For operating the *b* and *a* registers and gate 1 there is provided a path velocity clock 72 which drives a pulse train generator 73. The latter produces output pulses at a rate determined by the path velocity clock. These pulses are of two types: shift pulses, which are applied to the *b* and *a* registers, and test pulses, which are applied to gate 1.

For each addition or subtraction to be performed in the arithmetic unit, a train of successive discrete shift pulses are applied through line 74 to both the *b* register 50 and the *a* register 51. The number *n* of shift pulses in the train is equal to the number of flip-flops in each of the registers. Each train of shift pulses shifts the ΔX number out of the *b* register and shifts the ΔY number out of the *a* register.

Each shift pulse train is followed by a test pulse on line 75 leading to gate 1.

If gate 4 is open, the ΔX number, which has been shifted out of the *b* register by the preceding train of shift pulses, is passed to the add/subtract unit 54, where it is added to the number in the accumulator.

If gate 5 is open, the ΔY number, which has been shifted out of the *a* register by the preceding train of shift pulses, is passed to the add/subtract unit 54, where it is subtracted from the number coming from the accumulator.

Either gate 4 or gate 5, but not both, will have been opened by the feedback carry signal from the carry memory flip-flop 71 which followed the preceding addition or subtraction operation in the arithmetic unit.

As a result of the addition or subtraction operation, a single pulse will be delivered either to line 68, to produce a single increment of movement of the tool in the X direction, or to line 69, to produce a single increment of movement of the tool in the Y direction.

Also as a result of the addition or subtraction, a new number will be stored in the accumulator 52, and the sign of this number will determine whether the next arithmetic operation is to be a subtraction of ΔY or an addition of ΔX.

It will be apparent that this circuit operates on the principles described with reference to FIGS. 7a, 7b and 7c. As already explained, for a straight line the numbers in the *b* and *a* registers remain unchanged, since such a line has a constant slope.

*Circular arc generator—FIG. 9*

FIG. 9 is a block diagram showing the components of the present curve generator which are used in generating a circular arc in response to the reading of data from a tape as shown in FIG. 4.

All of the components of the FIG. 8 circuit are present in the FIG. 9 circuit, where they are given the same reference numerals. The functions of these previously-described units will not be restated. It should be noted that the *b* register in FIG. 9 stores the Y number and the *a* register stores the X number, which differs from the arrangement of FIG. 8, because now the slope $\Delta Y/\Delta X$ of the curve at any given point is the reciprocal of $X/Y$, where X and Y are the coordinates from that point to the center of the circle.

In FIG. 9 an add/subtract unit 76 is connected between the output of the *b* register 50 and gate 4. The input line to this add/subtract unit is designated 55' and its output line is designated 55".

A similar add/subtract unit 77 is connected between the output line 59' from the *a* register and a line 59" leading to gate 5.

The numbers initially stored in the *a* and *b* registers are the parameters $\underline{X}$ and $\underline{Y}$, respectively, which are the coordinate distances of the starting point 22 (FIG. 2b) from the center of the circle. The ratio $(\underline{X}/\underline{Y})$ of these numbers gives the angular coefficient of the tangent $(\Delta Y/\Delta X)$ to the circle at that point. However, this tangent changes as the tool moves along the arc. Therefore, the numbers stored in the *a* and *b* registers must be modified to reflect the changed position along the circular arc. In the present invention for each command pulse to the tool in the X direction, the tool is moved a single increment of movement and the number stored in the *a* register is changed by one, either plus or minus, depending upon the direction of such X movement. The same operation is performed on the number in the *b* register for each command pulse in the Y direction.

"Add" and "subtract" control signals are applied to the *b* register's add/subtract unit 76 through lines 78 and 79. "Add" and "subtract" control signals are applied to the *a* register's add/subtract unit 77 through lines 80 and 81.

A Y carry flip-flop 82 is associated with the add/subtract unit 76 for the *b* register. This flip-flop is connected by line 83 to the command pulse output line 69 for tool movement in the Y direction. The Y carry flip-flop 82 is set to "one" each time there is a Y command pulse. This carry "one" signal is fed back via line 84 from the Y carry flip-flop 82 back to the Y add/subtract unit 76. Therefore, the number "one" is either added to or subtracted from the *b* register number in the add/subtract unit 76. This takes place when the next train of shift pulses shifts the Y number out of the *b* register into the add/subtract unit 76. The new Y number goes to gate 4 and thence to the main add/subtract unit 54 if gate 4 is open. Also, the new Y number is fed back via feedback line 58' to the *b* register.

A similar arrangement is provided in association with the X add/subtract unit 77. The X carry flip-flop, designated by the reference numeral 86, is connected by line 87 to the X command pulse output line 68. A feedback line 88 extends from the X carry flip-flop 86 back to the X add/subtract unit 77. The operation of this arrangement is the same as that already described in detail for the *b* register.

With the foregoing arrangement, the X or Y number is modified to correspond to the actual tool position after each X or Y command pulse.

Except for this modification, the arithmetic operation is the same as described for the straight line generator circuit.

Figure 10:
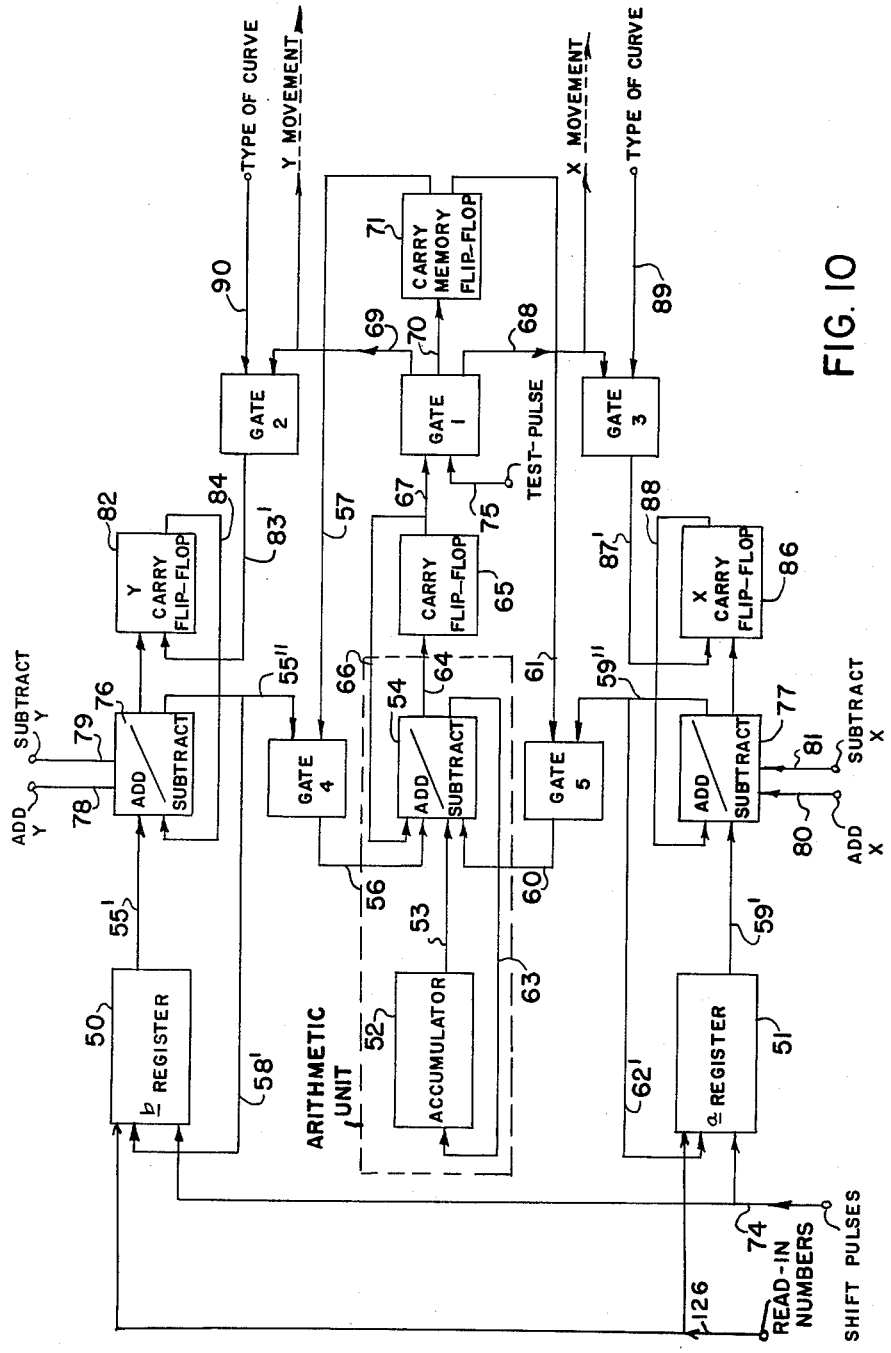
FIG. 10 is a similar view showing components of the curve generator which operate during the generation of a parabolic curve.

*Parabolic curve generator—FIG. 10*

FIG. 10 is a block diagram showing the components of the present curve generator which are used in generating a parabolic curve in response to the reading of data from the tape as shown in FIG. 5.

All of the components of the FIG. 9 circuit are present in FIG. 10.

In addition, there are provided two more gates, designated "gate 2" and "gate 3," respectively, which control the operation of the Y carry flip-flop 82 and the X carry flip-flop 86. Gate 2 is connected between the Y command pulse output line 69 and a feedback line 83' leading to the Y carry flip-flop 82. Gate 3 is connected between the X command pulse output line 68 and a feedback line 87' leading to the X carry flip-flop 86.

As already pointed out in the section on arithmetic operations, only one or the other of the X and Y numbers (in the *a* and *b* registers, respectively) will change during the generation of the curve. The direction of the axis of the parabola (either parallel to the X coordinate axis or parallel to the Y coordinate axis) will determine which one of these numbers is changed.

If the axis of the parabola is parallel to the X axis, then gate 3 will remain closed at all times by means of a control signal applied through line 89. Gate 2 will be open at all times by means of a control signal applied through line 90. Therefore, while the X number in the *a* register 51 will remain the same throughout the generation of the curve, the Y number in the *b* register will be changed by *one* each time there is a command pulse to the Y command line 69.

The converse holds true when the axis of the parabola to be generated is parallel to the Y axis.

The choice of the parabola axis is done by the symbol $T_p$ (+ or −) punched on the tape (FIG. 5).

When a parabola is to be generated the numbers X̲ and Y̲, which represent the coordinate distances of the starting point 24 (FIG. 2c) from the vertex V of the parabola are respectively fed into the *a* and *b* registers 50 and 51 initially. Thereafter the arithmetic operations take place in the manner already indicated to generate the curve.

The circuit of FIG. 10 may be arranged to generate a circular curve simply by applying to the lines 89 and 90 control signals which will maintain both gates 2 and 3 open at all times.

The FIG. 10 circuit may be arranged to generate a straight line simply by applying to the lines 89 and 90 control signals which will maintain both gates 2 and 3 closed at all times.

Figure 11:
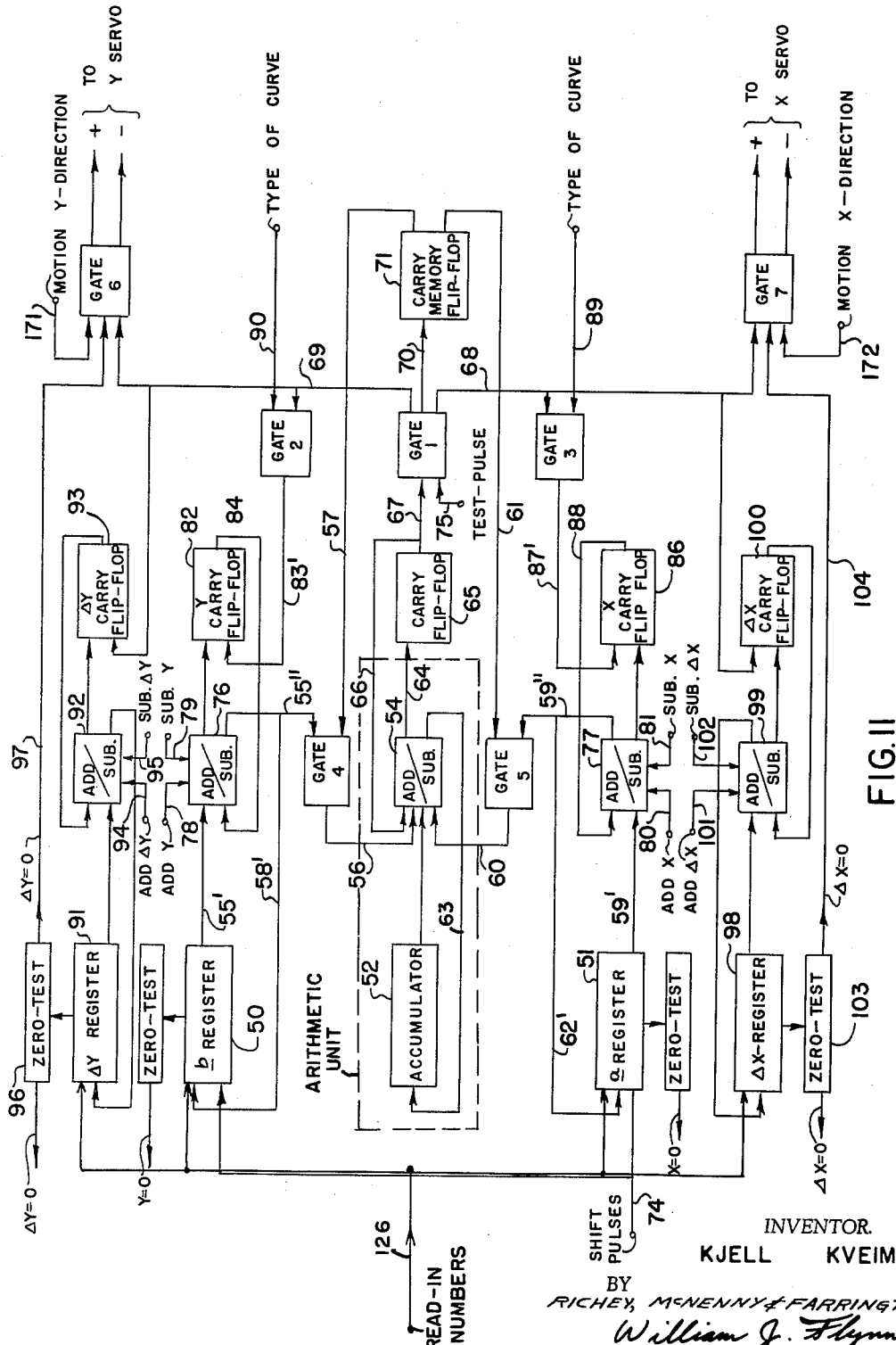
FIG. 11 is a similar view showing the complete curve generator.

*Complete curve generator—FIG. 11*

The complete curve generator is shown in FIG. 11. In addition to the components already described, it includes means for sensing when the end point of any particular designated curve has been reached.

A ΔY register 91 has associated therewith a ΔY add/substract unit 92 and a ΔY carry flip-flop 93. These components are interconnected for operation in the same manner as the *b* register 50, the add/subtract unit 76 and the carry flip-flop 82, already described in detail. Every time a Y movement command pulse is applied to line 69, the number *one* is either added to or subtracted from the number in the ΔY register 91, depending upon the direction of movement specified for the Y command pulse— that is, whether toward or away from the end point in the Y coordinate direction. Add and subtract control signals are applied through lines 94 and 95 to the add/subtract unit 92.

Accordingly, the number in the ΔY register at any time represents the Y coordinate distance of the difference between the actual position of the tool and the end point of the particular curve being generated. Therefore, when the tool reaches the Y coordinate end point position, the number in the ΔY register 91 becomes zero.

Zero-test circuitry 96 is connected to the ΔY register so that when it reaches zero a control signal will be sent via line 97 to close a gate, designated "gate 6," which is connected between the Y command output line 69 and the Y servo. This positively prevents any additional Y command pulses from being applied to move the tool any farther in the Y direction during the remainder, if any, of the generation of this particular curve.

An identical arrangement is provided for sensing the end point of the tool in the X coordinate direction for each particular curve. This arrangement includes a ΔX register 98, a ΔX add/subtract unit 99, a ΔX carry flip-flop 100, "add" and "subtract" control signal lines 101 and 102, zero-test circuitry 103, and a control signal line 104 from the latter to a gate, designated "gate 7," which is connected between the X command output line 69 and the X servo.

It will be understood that the initial numbers fed into the ΔX and ΔY registers are the correspondingly designated numbers read from the tape.

When both the ΔX and ΔY registers reach zero an "end of curve" signal will be sent via line 36 in FIG. 6, from the numerical curve generator 32 to the reader control and data distributor 31 to indicate the end of the generation of this particular curve, and to start the reading of the parameters of the next curve from the tape.

*Reader control and data distributor*

Figure 12:
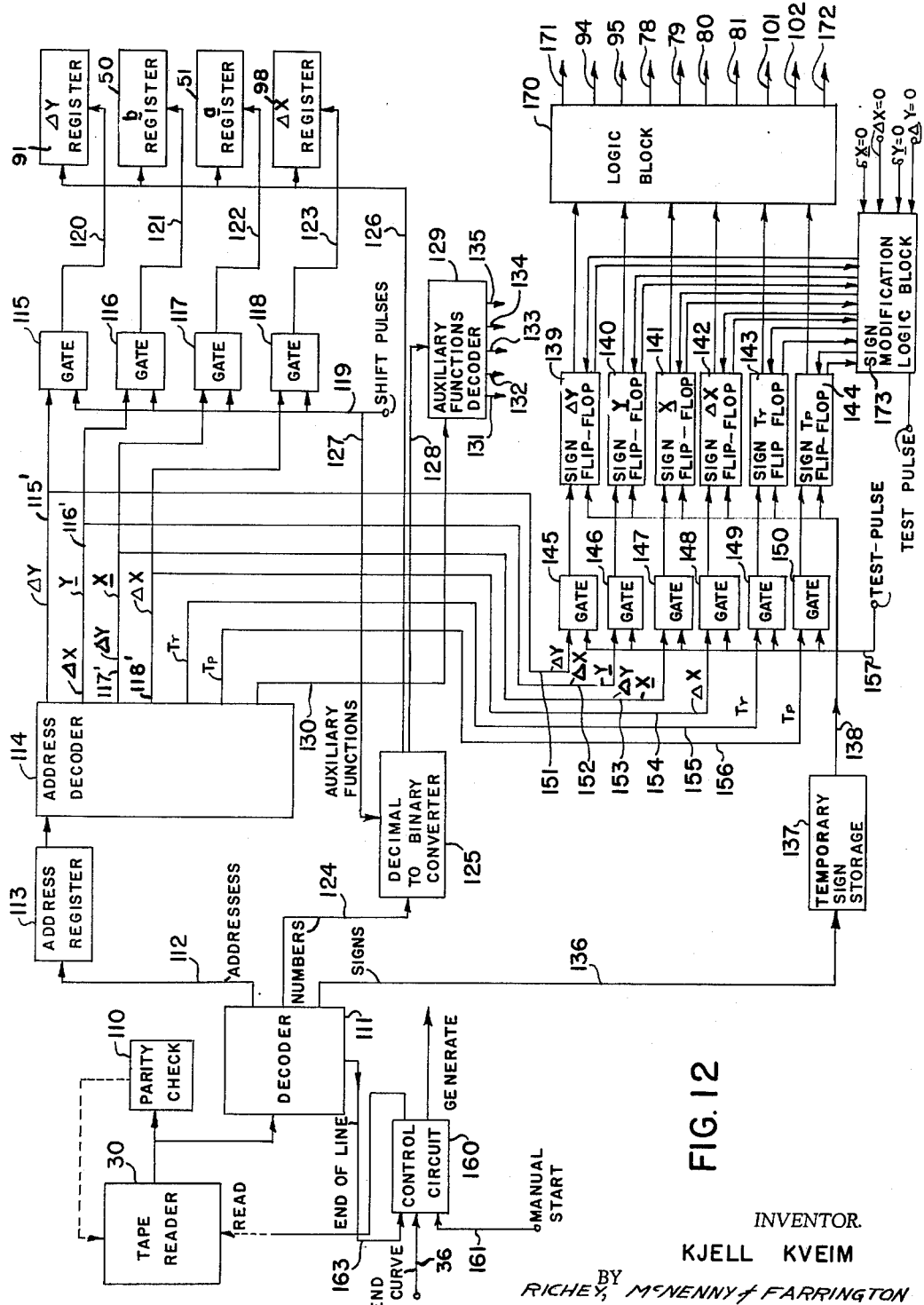
FIG. 12 is a schematic block diagram of the reader control and data distributor in the present control system.

The reader control and data distributor, already mentioned in the description of FIG. 6, is shown in block diagram form in FIG. 12.

The tape reader 30 has an output line connected to parity checking unit 110, which checks all of the output information coming from the reader for parity. If a reading shows wrong parity the checking unit produces a signal which stops the reader 30.

The tape reader 30 also has an output line connected to a decoder 111. This decoder sorts the read-in information into three categories: addressess, numbers and signs. As already mentioned, an address precedes each number on the tape, in accordance with Electronic Industries Association standards.

The decoder 111 has an address output line 112 leading to a register 113, which stores the read-in addresses. The address register has its output connected to the input of a decoder 114, which sorts the addresses into the following seven possible categories: ΔX, X̱, ΔY, Y̱, T$_r$, T$_p$ and Auxiliary Functions. Four output lines, 115', 116', 117' and 118', respectively, lead from the decoder to corresponding individual gates 115, 116, 117 and 118, respectively. Each of these gates has an input terminal connected to receive shift pulses applied to line 119. The arrangement is such that the shift pulses operate the gates 115 to 118 to permit a signal to be generated on the respective gate's output line 120, 121, 122 or 123 when there is a coincidence between an address control signal on the respective gate's input line 115', 116', 117' or 118' and a shift pulse on line 119. This passes the address control signals from the decoder 114 through lines 120, 121, 122 and 123, respectively, to the ΔY register 91, and b register 50, the a register 51, and the ΔX register 98.

A second output line 124 from the decoder 111 conducts the read-in numbers to a decimal to binary converter 125. As already pointed out, each number recorded on the punched tape is in binary-coded decimal form, whereas the curve generator (FIG. 11) operates in response to binary numbers. Therefore, it is necessary to convert the numbers read in from the tape to true binary numbers.

An output line 126 from the converter 125 applies the read-in and converted binary numbers to input terminals of the ΔY register 91, the b register 50, the a register 51 and the ΔX register 98. A number is stored in a particular register only if the register has been conditioned by the shift pulses received from the respective line 120, 121, 122 or 123. The converter 125 is conditioned to pass read-in numbers to its output line 126 in response to shift pulses applied to line 127.

The converter 125 also has an output line 128 leading to a decoder 129. On the record tape the "auxiliary functions" of the machine tool are each recorded as an address followed by a number. The address is decoded by the aforementioned address decoder 114. The read-in number for the auxiliary function is converted to binary form in the converter 125 and is applied through line 128 to an input of the decoder 129. This decoder is conditioned by an address control signal coming from the address decoder 114 via line 130, to pass the auxiliary function number from the decoder 129 to the output line 131, 132, 133, 134 or 135 which corresponds to the particular auxiliary function desired.

A third output line 136 from the decoder 111 conducts the read-in signs (+ or −) to a temporary storage device 137. This device has an output line 138 connected to the input of each of six separate flip-flops 139, 140, 141, 142, 143 and 144 which are respectively for the sign of ΔY, Y̱, X̱, ΔX, T$_r$ or T$_p$. Each of these flip-flops 139 to 144 is connected to be conditioned to respond to a "sign" input signal at line 138 by a respective gate 145, 146, 147, 148, 149 or 150. These gates are connected through respective input lines 151, 152, 153, 154, 155 and 156 to receive address control signals from the address decoder 114. Each of the gates 145 to 150 has an input terminal connected through line 157 to receive a test pulse.

In operation, when one of the gates 145 to 150 is conditioned by a respective address signal from the address decoder 114, a test pulse applied to line 157 will pass through that gate to condition the corresponding flip-flop 139, 140, 141, 142, 143 or 144. Then the read-in sign signal applied to line 138 operates the flip-flop which has been so conditioned.

To recapitulate the operation of this circuit, during the reading-in of data from the record tape, such data are divided into separate categories by the decoder 111. Each read-in address conditions the operation of the respective number register for the ΔX, X̱, Y̱ or ΔY number which follows that address and/or it conditions the respective gate 145, 146, 147, 148, 149 or 150 for the respective sign flip-flop 139, 140, 141, 142, 143 or 144. The read-in numbers for ΔX, X̱, Y̱ and ΔY are converted to true binary numbers and then are fed into the appropriate registers 98, 51, 50 and 91, respectively. Read-in numbers which designate auxiliary functions are similarly converted and then are decoded. The read-in signs operate the flip-flops 139 to 144 after the latter have been conditioned by the respective decoded addresses.

In feeding the read-in numbers into the ΔX, a, b and ΔY registers, it is to be understood that if the curve is a straight line, the same number (ΔX) is fed into both the b register 50 and the ΔX register 98, and the same number (ΔY) is fed into both the a register 51 and the ΔY register 91. For this reason the address decoder is designed to produce gate signals simultaneously on its output lines 116' and 118' in response to the ΔX address and simultaneously on its output lines 115' and 117' in response to the ΔY address.

In the case of circular arcs or parabolic curves, the read-in X̱ and Y̱ numbers will differ form the ΔX and ΔY numbers, of course. As shown in FIGS. 3 to 5, on the tape the parameters ΔX and ΔY always precede the parameters X̱ and Y̱ so that even though the ΔX and ΔY numbers are fed into the b and a registers 50 and 51, respectively, they are then displaced by the Y̱ and X̱ numbers, respectively.

Accordingly, if a straight line is to be generated, the ΔX number will be stored in the b register 50 and the ΔY number will be stored in the a register as the starting number, prior to the curve generating operation, as described in connection with FIGURE 8. However, if a curve other than a straight line is to be generated, the Y̱ number will be stored as the starting number in the b register 50 and the X̱ number will be stored as the starting number in the a register 51 before the curve generating operation begins, as described in connection with FIGURES 9 and 10.

In addition to being under the control of the parity checking device 110, the tape reader 30 is under the control of a control circuit 160. This control circuit has three inputs: "manual start" 161, "end of curve" 36, and "end of line" 163. The function of the control circuit 160 is to cause the tape reader 30 to read in the data from the record tape and then to stop the tape reading and cause the numerical curve generator (FIG. 11) to generate a curve corresponding to the data just read in from the tape.

The tape reading begins immediately when the control circuit 160 receives (via line 36) an "end of curve" signal from the numerical curve generator, which indicates that the preceding curve has been completed. As explained in the description of FIG. 11, this "end of curve" signal is fed back via line 36 when both the ΔX and ΔY registers in the numerical curve generator (FIG. 11) reach zero.

After the tape reader has completed its reading of all the data for the next curve, it reads the E ("end of line") signal on the tape. This signal is decoded in the decoder 111 and is passed through line 163 to condition the control circuit 160 to stop the tape reader 30 and to start the curve generation in the numerical curve generator (FIG. 11.)

The sign flip-flops 139–144 have output lines leading to a block 170 of logic circuitry which has a plurality of individual output lines for controlling the operation of the curve generator (FIG. 11). These lines are given the same reference numerals as in FIG. 11. The signal, designating either + or −, on each of these lines controls the following functions in the curve generator:

(1) the signal line 171 controls gate 6 (FIG. 11) to determine whether the Y coordinate movement shall be in the forward or backward direction;

(2) the signal on either line 94 or line 95 controls the ΔY add/subtract unit 92 to perform either addition or subtraction operations so as to change the number in the ΔY register after each incremental movement of the tool in the Y coordinate direction;

(3) the signal on either line 78 or line 79 controls the add/subtract unit 76 associated with the *b* register to perform either addition or subtraction operations so as to change the number in the *b* register after each incremental movement of the tool in the Y coordinate direction (if gate 2 is open);

(4) the signal on either line 80 or line 81 controls the add/subtract unit 77 associated with the *a* register to perform either addition or subtraction operations so as to change the number in the *a* register after each incremental movement of the tool in the X coordinate direction (if gate 3 is open);

(5) the signal on either line 101 or line 102 controls the ΔX add/subtract unit 99 to perform either addition or subtraction operations so as to change the number in the ΔX register after each incremental movement of the tool in the X coordinate direction;

(6) the signal on line 172 controls gate 7 to determine whether the X coordinate movement of the tool shall be in the forward or backward direction.

The logic functions performed by the logic block 170 are shown in the table of FIG. 14. This table lists all possible combinations of the signs and the corresponding output signal values.

FIG. 14 also shows the equivalent Boolean expressions for all of the output signals.

During the generation of circular arcs or parabolic curves, for example, one or more signs may have to be changed when the curve passes from one quadrant to another. For this purpose another block 173 of logic circuitry is connected to the sign flip-flops 139–144 in FIG. 12. This logic block is under the control of the zero-test circuitry such that it changes a sign only when the corresponding figure reaches zero. For this purpose, the logic block is under the control of zero-test signals on the respective lines labelled $X=0$, $\Delta X=0$, $Y=0$, $\Delta Y=0$, in FIG. 12 and in FIG. 11.

FIG. 15 shows the functions of the logic block 173 and the equivalent Boolean expressions.

The logic block 170 controls the operation of the curve generator. The logic block 173, by virtue of its control over the sign flip-flops 139–144, controls the operation of logic block 170 to take care of the situation when the curve passes either an $\underline{X}=0$ point, a $\underline{Y}=0$ point, a $\Delta X=0$ point or a $\Delta Y=0$ point.

Each logic block 170 and 173 is composed of a plurality of binary switching devices interconnected in accordance with known principles (set forth in the following publications: Pressman, "Design of Transistorized Circuits for Computers," Rider, 1959; Hurley, "Transistor Logic Circuits," Wiley, 1961; Phister, "Logical Design of Digital Computers," Wiley, 1958; Jeffrey and Reed, "The Use of Boolean Algebra in Logical Design," M.I.T. Report E–458–1, 1952) to perform logical operations as tabulated in FIGS. 14 and 15, respectively.

Figure 16A:
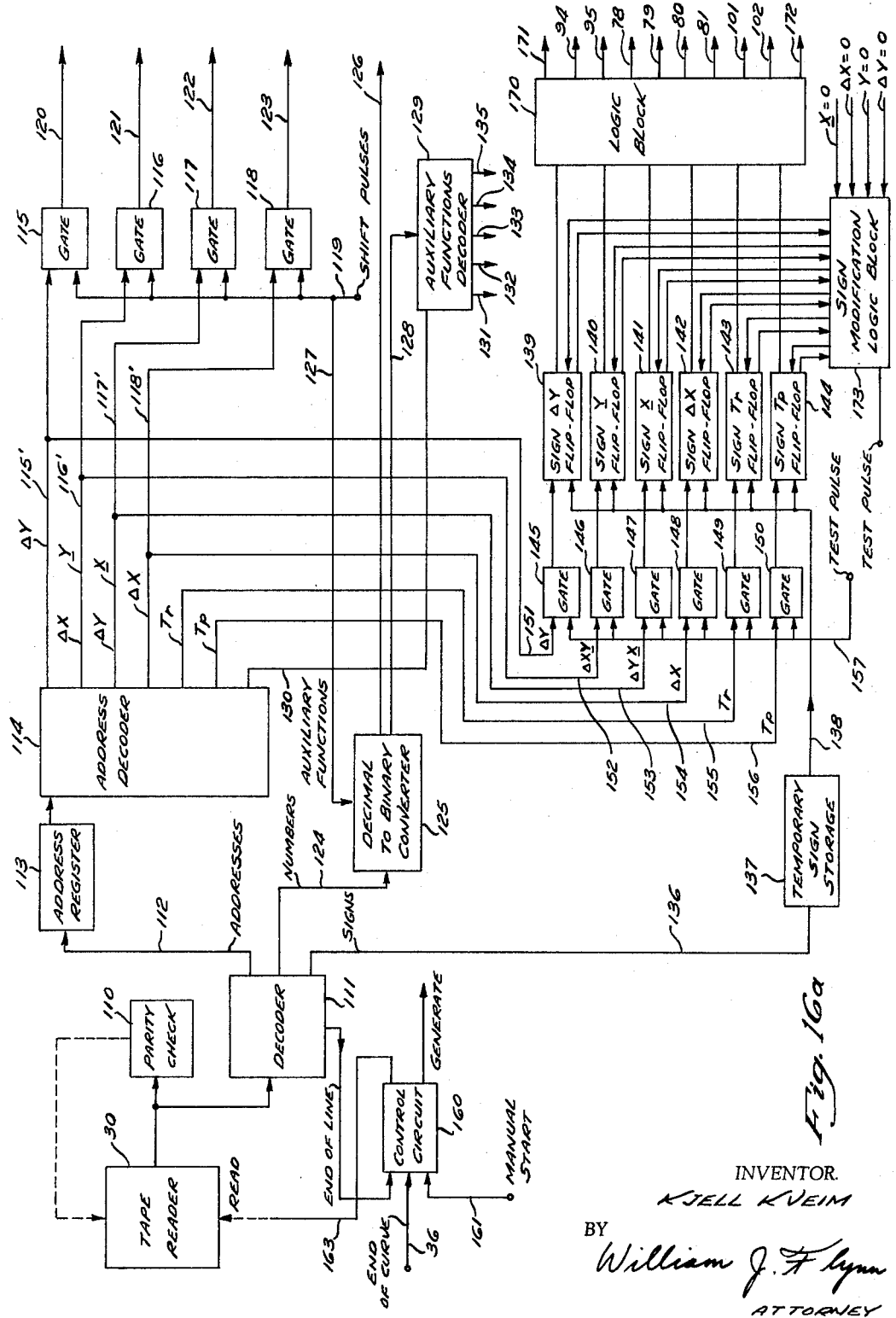

In FIG. 14, the first six columns (sign ΔX, sign ΔY, sign $\underline{X}$, sign $\underline{Y}$, sign $T_r$, and sign $T_p$) are the six inputs to the logic block 170 from the respective sign flip-flops 139–144 (FIG. 16*a*). The final six columns in FIG. 14 show the ten possible output signals from the logic block, namely, sign ΔX, sign ΔY, sign $\underline{X}$, sign $\underline{Y}$ (each of which may be either "add" or "subtract" on line 101 or 102, line 94 or 95, line 80 or 81, and line 78 or 79, respectively, in FIGS. 16*a* and 16*b*), X-mov. (line 172) and Y-mov. (line 171). Each possible combination of the six input signals to logic block 170 produces a corresponding unique combination of the six output signals, as tabulated in FIG. 14.

Considering the operation of logic block 170 when a circular arc (FIG. 2*b*) is to be generated, reference is made to FIGS. 17–20. In these figures the following conventions are followed: clockwise rotation ($T_r$) is negative; counterclockwise rotation is positive; above the X axis, ΔY is positive; below the X axis, ΔY is negative; to the right of the Y axis, ΔX is positive; to the left of the Y axis, ΔX is negative; the starting point 22 is the origin of the X and Y axes.

In each of FIGURES 17–20 there are upper and lower "change sign $\underline{X}$" points on the circle, which are aligned vertically with the center C. By definition, $\underline{X}$ is the horizontal distance from a point on the curve to the center of the circle. To the left of the center C, sign $\underline{X}$ is +; to the right of the center C, sign $\underline{X}$ is —.

Similarly, there are left and right-hand "change sign $\underline{Y}$" points on the circle, which are aligned horizontally with the center C. By definition, $\underline{Y}$ is the vertical distance from a point on the curve to the center of the circle. Above this center, sign $\underline{Y}$ is —; below this center, sign $\underline{Y}$ is +.

Figure 17:
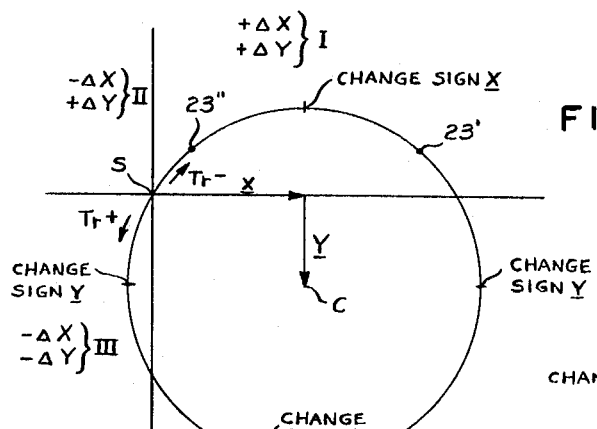
FIGURES 17, 18, 19 and 20 illustrate the four possible circular curves which may be generated in accordance with four different positions of the starting point of the curve with respect to the center of the circle.

In FIG. 17, the location of the starting point S with respect to the center C of the circular arc is such that sign $\underline{X}$ is + and sign $\underline{Y}$ is —.

If the direction of rotation from the starting point S to the end point is clockwise ($T_r$—) in FIG. 17, then:

(a) If the end of the curve is in quadrant I, as specified by sign $\Delta X=+$ and sign $\Delta Y=+$ in the respective inputs to logic block 170 from the flip-flops 142 and 139, then the conditions stated in line 15 of the FIG. 14 table are established initially in the logic block 170. (When the curve either passes the "change sign $\underline{X}$" point in this quadrant or passes a "change sign ΔY point," then the logic block 173 changes one of the inputs to logic block 170 so as to produce a corresponding change or changes in output signals from logic block 170, as explained hereinafter.)

(b) If the end of the curve is in quadrant IV, as specified by sign $\Delta X=+$ and sign $\Delta Y=-$ in the respective inputs to logic block 170, then the conditions stated in line 13 of the FIG. 14 table are established initially in logic block 170. (Whenever the curve passes a "change sign $\underline{X}$" point or a "change sign $\underline{Y}$" point or a "change ΔX" point or a "change ΔY" point, then the logic block 173 changes the conditions in logic block 170, as explained hereinafter.)

(c) If the end of the curve is in quadrant III, as specified by sign $\Delta X=-$ and sign $\Delta Y=-$ in the respective inputs to logic block 170, then the conditions stated in line 9 of the FIG. 14 table are established initially in logic block 170. (Each time one of the aforementioned possible "change sign" points on the curve is points, then logic block 173 changes the conditions in logic block 170 accordingly.)

In FIG. 17, if the direction of rotation is counterclockwise ($T_r$+), then:

(a) If the end of the curve is in quadrant I (+ΔX, +ΔY), then the conditions stated in line 16 of the FIG. 14 table are obtained initially in logic block 170. (Each time the curve passes one of the aforementioned possible "change sign" points, then logic block 173 changes the conditions in logic block 170 accordingly.)

(b) If the end of the curve is in quadrant IV (+ΔX, —ΔY), then the conditions stated in line 14 of the FIG. 14 table are established initially in logic block 170. (Each time the curve passes one of the "change sign" points, then logic block 173 changes the conditions in logic block 170 accordingly.)

(c) If the end of the curve is in quadrant III (—ΔX, —ΔY), then the conditions stated in line 10 of the FIG. 14 table are established initially in logic block 170. (Each time the curve passes one of the "change sign" points, then logic block 173 changes the conditions in logic block 170 accordingly.)

From the foregoing it will be apparent that FIG. 17 depicts six of the twenty-four possible starting conditions for logic block 170 which are listed in the FIG. 14 table.

Figure 18:
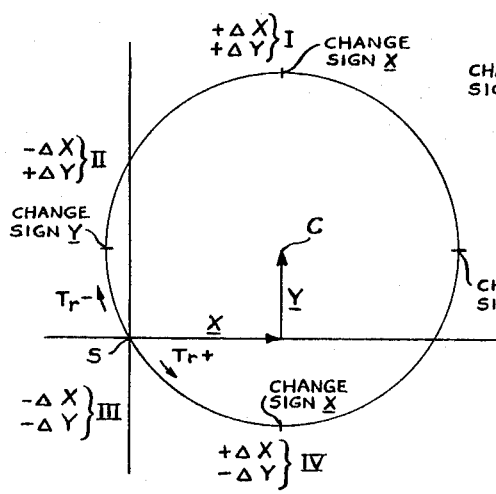

In FIG. 18 the location of the starting point S with respect to the center C is such that sign $\underline{X}$ is $+$ and sign $\underline{Y}$ is $+$.

If the direction of rotation is clockwise ($T_r-$) in FIG. 18, then:

(a) If the end of the curve is in quadrant I, as specified by sign $\Delta X=+$ and sign $\Delta Y=+$ in the respective inputs to logic block 170, then the conditions stated in line 1 of the FIG. 14 table are established initially in the logic block 170.

(b) If the end of the curve is in quadrant IV, as specified by sign $\Delta X=+$ and sign $\Delta Y=-$ in the respective inputs to logic block 170, then the conditions stated in line 17 of the FIG. 14 table are established initially in the logic block 170.

(c) If the end of the curve is in quadrant II, as specified by sign $\Delta X=-$ and sign $\Delta Y=+$ in the respective inputs to logic block 170, then the conditions stated in line 3 of the FIG. 14 table are established initially in the logic block 170.

In FIG. 18 if the direction of rotation is counterclockwise ($T_r+$), then:

(a) If the end of the curve is in quadrant I ($+\Delta X$, $+\Delta Y$), then the conditions stated in line 2 of the FIG. 14 table are established initially in the logic block 170.

(b) If the end of the curve is in quadrant IV ($+\Delta X$, $-\Delta Y$), then the conditions stated in line 18 of the FIG. 14 table are established initially in the logic block 170.

(c) If the end of the curve is in quadrant II ($-\Delta X$, $+\Delta Y$), then the conditions stated in line 4 of the FIG. 14 table are established initially in the logic block 170.

Thus, FIG. 18 depicts an additional six of the twenty-four possible starting conditions for logic block 170 which are listed in the FIG. 14 table.

It is to be understood that each time the curve passes one of the possible "change sign" points in FIG. 18, then the logic block 173 changes the condition in logic block 170.

Figure 19:
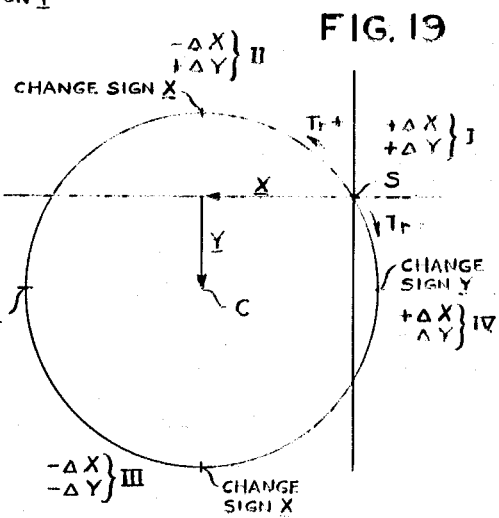

In FIG. 19 the location of the starting point S with respect to the center C is such that sign $\underline{X}$ is $-$ and sign $\underline{Y}$ is $-$.

In FIG. 19, if the direction of rotation is clockwise ($T_r-$), then:

(a) If the end of the curve is in quadrant IV, as specified by sign $\Delta X=+$ and sign $\Delta Y=-$ in the respective inputs to logic block 170, then the conditions stated in line 19 of the FIG. 14 table are established initially in the logic block 170.

(b) If the end of the curve is in quadrant III, as specified by sign $\Delta X=-$ and sign $\Delta Y=-$ in the respective inputs to logic block 170, then the conditions stated in line 5 of the FIG. 14 table are established initially in the logic block 170.

(c) If the end of the curve is in quadrant II, as specified by sign $\Delta X=-$ and sign $\Delta Y=+$ in the respective inputs to logic block 170, then the conditions stated in line 7 of the FIG. 14 table are established initially in the logic block 170.

In FIG. 19, if the direction of rotation is counterclockwise ($T_r+$) then:

(a) If the end of the curve is in quadrant IV ($+\Delta X$, $-\Delta Y$), then the conditions stated in line 20 of the FIG. 14 table are established initially in the logic block 170.

(b) If the end of the curve is in quadrant III ($-\Delta X$, $-\Delta Y$), then the conditions stated in line 6 of the FIG. 14 table are established initially in the logic block 170.

(c) If the end of the curve is in quadrant II ($-\Delta X$, $+\Delta Y$), then the conditions stated in line 8 of the FIG. 14 table are established initially in the logic block 170.

Thus, FIG. 19 illustrates another six of the twenty-four possible starting conditions for logic block 170 which are listed in the FIG. 14 table.

Here again, logic block 173 will change the conditions in logic block 170 each time the curve passes one of the possible "change sign" points in FIG. 19.

Figure 20:
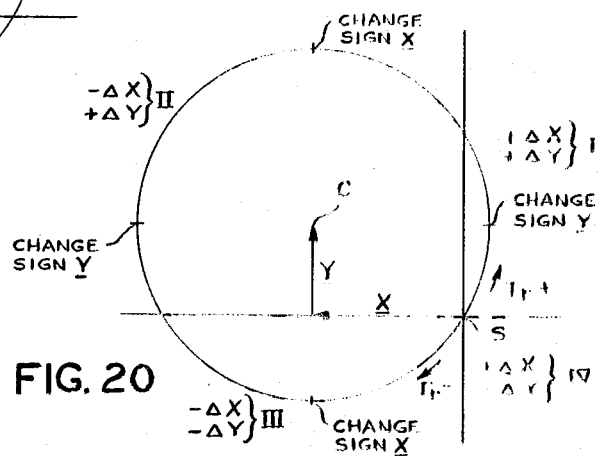

In FIG. 20 the location of the starting point S with respect to the center C is such that sign $\underline{X}$ is $-$ and sign $\underline{Y}$ is $+$.

In FIG. 20, if the direction of rotation is clockwise ($T_r-$), then:

(a) If the end of the curve is in quadrant III, as specified by sign $\Delta X=-$ and sign $\Delta Y=-$ in the respective inputs to the logic block 170, then the conditions stated in line 11 of the FIG. 14 table are established initially in the logic block 170.

(b) If the end of the curve is in quadrant II, as specified by sign $\Delta X=-$ and sign $\Delta Y=+$ in the respective inputs to the logic block 170, then the conditions stated in line 21 of the FIG. 14 table are established initially in the logic block 170.

(c) If the end of the curve is in quadrant I, as specified by sign $\Delta X=+$ and sign $\Delta Y=+$ in the respective inputs to the logic block 170, then the conditions stated in line 23 of the FIG. 14 table are established initially in the logic block 170.

In FIG. 20, if the direction of rotation is counterclockwise ($T_r+$) then:

(a) If the end of the curve is in quadrant III ($\Delta X-$, $\Delta Y-$), then the conditions stated in line 12 of the FIG. 14 table are established initially in the logic block 170.

(b) If the end of the curve is in quadrant II ($\Delta X-$, $\Delta Y+$), then the conditions specified in line 22 of the FIG. 14 table are established initially in the logic block 170.

(c) If the end of the curve is in quadrant I ($\Delta X+$, $\Delta Y+$), then the conditions specified in line 24 of the FIG. 14 table are established initially in the logic block 170.

Thus, FIG. 20 illustrates the remaining six possible starting conditions for logic block 170 which are listed in the FIG. 14 table.

Each time the curve passes a "change sign" point in FIG. 20, then logic block 173 changes the conditions in logic block 170 accordingly.

As shown in FIG. 12, the sign modification logic block 173 has six output lines connected respectively to the sign flip-flops 139–144, and these sign flip-flops in turn have their respective output lines connected to the logic block 170. Logic block 173 has four input lines, designated in FIG. 12 as $\underline{X}=0$, $\Delta X=0$, $\underline{Y}=0$, and $\Delta Y=0$. These are the correspondingly designated output lines from the zero-test circuits associated respectively with the $a$ register 51, the $\Delta X$ register 98, the $b$ register 50 and the $\Delta Y$ register 91 in FIG. 11. When the curve reaches one of the zero points, then the number in the corresponding one of these registers will reach zero, and this will be sensed by the respective zero-test circuit, which will produce a signal on the respective input line to the sign modification logic block 173 in FIG. 12.

The table of FIG. 15 shows the operation of logic block 173 in response to each of these zero-test input signals.

For example, in FIG. 17 if the end point is at 23' in quadrant I and the direction of rotation is clockwise ($T_r-$), then the initial conditions in logic block 170 are as stated in line 15 of the FIG. 14 table, the X movement being positive (to the right) and the Y movement being positive (upward).

When the curve moves up past the point 23", at the same $\Delta Y$ position as the end point 23', then sign $\Delta Y$ change from $+$ to $-$, because now the curve is above the end point 23'. As shown in the FIG. 15 table, at this point 23" (where $\Delta Y=0$, sign $\underline{X}=+$, and $T_r=-$), sign $\Delta Y$ is set to $-$. Accordingly, logic block 173 changes the sign $\Delta Y$ input signal to logic block 170 so that now the condition in logic block 170 is as stated in line 13 of the FIG. 14 table. The directions of X and Y movement remain as before.

This condition prevails in logic block 170 until the curve passes the "change sign $\underline{X}$" point in quadrant I. At this point, the curve is passing from the left of the center C to the right, and therefore sign $\underline{X}$ should change from + to —. As shown in the FIG. 15 table, at this point (where $\underline{X}=0$, sign $\underline{Y}=-$ and $T_r=-$), sign $\underline{X}$ is set to —. Accordingly, logic block 173 changes the sign $\underline{X}$ input signal to logic block 170 so that now the condition in logic block 170 is as stated in line 19 of the FIG. 14 table. The X movement remains positive, but the Y movement now becomes negative (downward).

The foregoing analysis can be carried out for any selected end point in any one of FIGS. 17–20.

In any such case, the parameters read in from the tape (namely: $\underline{X}$ and $\underline{Y}$, the respective distances from the starting point of the curve to the center C along the X and Y coordinate axes; $\Delta X$ and $\Delta Y$, the respective distances from the starting point to the end point of the curve; and $T_r$, the direction of rotation) determine the initial condition in logic block 170. However, every time any one of the $\Delta X$, $\Delta Y$, $\underline{X}$, or $\underline{Y}$ numbers in the respective $\Delta X$, $\Delta Y$, $a$ and $b$ registers reaches zero (i.e., when the curve passes one of the "change sign" points), then this will produce an input signal to logic block 173 which, in turn, will change one of the input signals to logic block 170. This, in turn, will change the condition of logic block 170 and will cause the latter to change one or more of its output signals.

The same analysis can be made for parabolic curves, but this analysis is omitted for the sake of brevity since it will be directly evident from the foregoing discussion.

Where the curve being generated is a straight line, the operation of logic block 170 will not be modified by logic block 173 because there will be no "change sign" points on the curve being generated.

Numerical servo

FIG. 13 illustrates the numerical servo for operating either the X motor or the Y motor. The command pulses coming from the numerical curve generator are fed in through separate positive and negative lines to a pulse timing circuit 200 having plus and minus output lines 201 and 202 leading to a bi-directional counter 203. This counter counts upward in response to pulses on the plus line and downward in response to pulses on the minus line. The number in the counter is converted to a proportional voltage by digital-to-analog converter 204 and this voltage, after amplification by an amplifier 205, is applied to the motor 206 which moves the tool in and X or Y direction, as the case may be.

Feedback is provided by means of a digitizer 207 driven by the same drive mechanism which drives the tool in the X or Y direction. This digitizer produces a pulse for each incremental or elementary movement of the tool. This feedback pulse is applied to a plus line 209 if the tool movement was in the positive direction and it is applied to the minus line if the tool movement was in the negative direction.

These feedback pulses are applied through the pulse timing circuit 200 to the bi-directional counter 203. However, the counter is so arranged that pulses on the plus line 209 are counted downward and pulses on the minus line 210 are counted upward. Therefore, the number in the counter 203 at any instant represents the difference between the wanted and actual positions of the tool.

The pulse timing circuit 200 is arranged to prevent a feedback pulse, from line 209 or line 210, from being applied simultaneously to the counter 203 with a command pulse. Such coincidence would produce incorrect counting.

Résumé of operation

Referring to the complete circuit diagram of the present system, shown in FIGURES 16a and 16b, in operation the parameters for a particular curve section to be generated on the workpiece will have been recorded on punched tape. With the tool stopped, these parameters are read from the tape by the tape reader 30 (FIG. 16a) and then are decoded by decoder 111 (FIG. 16a) into the separate categories of "addresses," "numbers" and "signs."

As shown in FIGS. 3–5, on the control tape each number parameter is preceded by an address and a sign.

Each read-in address is applied, through the address register 113, to the address decoder 114. Decoder 114 separates the addresses into the seven categories: $\Delta X$, $\Delta Y$, $\underline{X}$, $\underline{Y}$, $T_r$, $T_p$ and "Auxiliary Functions."

Considering first the addresses ($\Delta X$, $\Delta Y$, $\underline{X}$ and $\underline{Y}$) which are associated with the number parameters of the curve to be generated, when one of these addresses is decoded, a corresponding address control signal appears on one or more of the output lines 115'–118' leading to gates 115–118, respectively. The $\Delta Y$ address control signal appears on both the line leading to gate 115 and the line leading to gate 117. The $\Delta X$ address control signal appears on both the line leading to gate 116 and the line leading to gate 118. The $\underline{Y}$ address control signal appears only on the line leading to gate 116, and this occurs some time after the $\Delta X$ address control signal for this section of the curve to be generated has appeared on this line because the $\Delta X$ parameters are read in from the tape before the $\underline{Y}$ parameters. The $\underline{X}$ address control signal appears only on the line leading to gate 117, and this occurs after the $\Delta Y$ address control signal for this section of the curve to be generated has appeared on this line because the $\Delta Y$ parameters are read in from the tape before the $\underline{X}$ parameters.

Each of these address control signals, when it coincides with a shift pulse on line 119, causes the respective gate (or gates) to pass a signal to the output line from that gate (or gates). For example, the $\Delta Y$ address control signal operates gates 115 and 117 to pass such signals, via lines 120 and 122, respectively, to the $\Delta Y$ register 91 and the $a$ register 51, respectively, to condition these registers to receive and store the $\Delta Y$ numerical parameter. In like manner, the $\Delta X$ address control signal operates gates 116 and 118 to pass signals which condition the $b$ register 50 and the $\Delta X$ register 98 to receive and store the $\Delta X$ numerical parameter. The $\underline{X}$ address control signal operates gate 117 to pass a signal which conditions the $a$ register 51 to receive and store the $\underline{X}$ numerical parameter. The $\underline{Y}$ address control signal operates gate 116 to pass a signal which conditions the $b$ register 50 to receive and store the $\underline{Y}$ numerical parameter.

Each number parameter, which is preceded by an address, after being read in from the tape and decoded in decoder 111, is converted to true binary form in converter 125. This binary number then is applied via line 126 simultaneously to the $\Delta Y$ register 91, the $b$ register 50, the $a$ register 51 and the $\Delta X$ register 98. Each register will receive and store this number only if that register has been so conditioned by the corresponding address control signal. Therefore, the $\Delta X$ binary number will be stored only in the $b$ register 50 and the $\Delta X$ register 98, the $\Delta Y$ number will be stored only in the $\Delta Y$ register 96 and the $a$ register 51, the $\underline{X}$ number will be stored only in the $a$ register 51, and the $\underline{Y}$ number will be stored only in the $b$ register 50.

As already mentioned, if the curve section to be generated is a straight line, there will be $\Delta X$ and $\Delta Y$ parameters, but no $\underline{X}$ and $\underline{Y}$ parameters. Therefore, the $\Delta X$ and $\Delta Y$ numbers will remain stored in the $b$ register 50 and the $a$ register 51, respectively, as the starting number therein.

However, if the curve section to be generated is other than a straight line, it will have $\underline{X}$ and $\underline{Y}$ parameters recorded on the tape after both the ΔX and ΔY parameters. Therefore, the X̲ number parameter, which is read in after the ΔY number parameter, will displace the ΔY number from the *a* register 51 before the beginning of the generation of this curve section, so that the X̲ number will be the starting number in the *a* register 51 for this curve section. Similarly, the Y̲ number will displace the ΔX number from the *b* register 50, so that the Y̲ number will be the starting number in the *b* register for this curve section.

The following table summarizes the foregoing possibilities, depending upon the type of curve to be generated:

| Curve Type | Register | Starting Number |
|---|---|---|
| Straight line | 50 | ΔX |
|  | 51 | ΔY |
|  | 91 | ΔY |
|  | 98 | ΔX |
| Circle, parabola, etc | 50 | Y̲ |
|  | 51 | X̲ |
|  | 91 | ΔY |
|  | 98 | ΔX |

The read-in and decoded addresses also produce signals on lines 151–156, which operate gates 145–150, respectively. When one of these gates has been opened, in response to the respective address, it passes a test pulse to the corresponding sign flip-flop 139, 140, 141, 142 or 143.

The read-in sign which also precedes each number on the tape, passes from the decoder 111 via line 136 to a temporary storage device 137 and thence via line 138 through one of the sign flip-flops 139–144, depending upon which address has just been read in. The read-in address has produced an address control signal on one of the lines 151–156 and this address control signal has operated the corresponding gate 145, 146, 147, 148, 149 or 150 to condition the corresponding flip-flop 139, 140, 141, 142, 143 or 144 to produce an output signal in response to the read-in sign signal appearing on line 138. This output signal from the respective flip-flop is applied to the logic block 170. As already explained, the various signs of ΔX, ΔY, X̲, Y̲ and T$_r$ for this curve section produce respective input signals to logic block 170 which determine the signals on the latter's output lines 94, 95, 78, 79, 80, 81, 101 and 102. Lines 94 and 95 are connected respectively to the add and subtract input terminals of the ΔY add/subtract unit 92 in FIG. 16*b*; lines 78 and 79 are connected respectively to the add and subtract input terminals of the Y̲ add/subtract unit 76; lines 80 and 81 are connected respectively to the add and subtract input terminals of the X̲ add/subtract unit 77; and lines 101 and 102 are connected respectively to the add and subtract input terminals of the ΔX add/subtract unit 99. With this arrangement the read-in signs of ΔX, ΔY, X̲, Y̲ and T$_r$ control the signals fed into the appropriate input terminals (add or subtract) in the add/subtract units associated with the registers which store the corresponding read-in numbers as the starting numbers.

The curve parameter T$_r$ (in the case of a circular arc), or the curve parameters T$_r$ and T$_p$ (in the case of a parabolic curve), are read from the tape after all of the number parameters (and the addresses and signs associated with them) for a given curve section have been read by the tape reader 30. This read-in curve parameter is sorted out by the address decoder 114 and is applied via line 155 (T$_r$) or 156 (T$_p$) to the corresponding gate 149 or 150. The read-in sign of this curve parameter is applied, via decoder 111, line 136, temporary sign storage device 137 and line 138, to the corresponding sign flip-flop 143 or 144. When curve parameter T$_r$ is read-in, gate 149 is opened to condition the corresponding flip-flop 143 to pass a "sign T$_r$" input signal to the logic block 170. Depending upon the polarity or sign (+ or −) of this signal and the signs of the numerical parameters (ΔX, ΔY, X̲ and Y̲) of this curve section which have also been fed into the logic block 170, output signals of the polarities specified in the table of FIG. 14 are applied to the output lines of logic block 170, output signals of the polarities specified in the table of FIG. 4. are applied to the output lines of logic block 170, including line 171 to gate 6 and 172 to gate 7 to determine the initial directions of movement of the tool in the Y and X coordinate directions.

When the tape reader has completed the reading of all the parameters for this particular curve section, it will read the "end of line" (E) signal. After being decoded in the decoder 111 (FIG. 16*a*) this signal operates the control circuit 160 to discontinue the tape reading operation and to start the curve generation operation. When this happens, the pulse train generator 73 (FIG. 16*b*), under the control of the path velocity clock 72, produces trains of shift pulses which are applied to line 74 to shift the read-in numbers out of the *a* and *b* registers over and over again.

As already stated, the number of shift pulses in each train or group of shift pulses is equal to the number of flip-flops in each of the registers 91, 50, 51 and 98.

The first train of shift pulses shifts out of each register which receives them the numerical parameter, ΔY, Y̲, X̲ or ΔX, which has been stored as the starting number therein, as a result of the read-in of that number parameter from the record tape.

Considering first the *b* register 50 and assuming that the curve to be generated is a circular arc, parabola etc. (not a straight line), the numerical parameter stored in that register as the starting number will be the Y̲ parameter number read in from the tape. This Y̲ number is shifted out of register 50 by the first train of shift pulses. This Y̲ number passes through the add/subtract unit 76 (where, at this time, no addition or subtraction takes place) to line 55″ leading to gate 4. If gate 4 is open, this original Y̲ number is fed into the add/subtract unit 54 in the arithmetic unit.

The original Y̲ number also is recirculated via line 58′ back to the input of the *b* register 50.

Still assuming that the curve to be generated is other than a straight line, the numerical parameter stored as the starting number in the *a* register will be the X̲ number, which was read in from the record tape.

The first train of shift pulses also shifts this original X̲ parameter number out of the *a* register 51. The original X̲ number passes through the add/subtract unit 77 (where, at this time, no addition or subtraction takes place) to line 59″ leading to gate 5. If gate 5 is open, this original X̲ number is fed into the add/subtract unit 54 in the arithmetic unit.

The original X number also is recirculated via line 62′ back to the *a* register 51.

Only one of the gates 4 and 5 is open at any given time. Assuming for purposes of discussion that gate 4 is open, the original Y̲ number is fed into the add/subtract unit 54. Here it is either added to, or subtracted from, the number (either positive or negative in sign) stored in accumulater 52. (If the arithmetic operation when the Y̲ number is fed into the add/subtract unit 54 is an addition, then the operation when the X̲ number is fed into unit 54 will be a subtraction, and vice versa.) Assuming that the Y̲ number is added to the accumulator number, the add/subtract unit 54 will cause the carry flip-flop 65 to assume a "one" condition, if the number which results from that addition is negative, or a "zero" condition, if the number which results from that addition is positive.

Also, this new number is fed back via line 63 to the accumulator 52 to serve as the accumulator number in the next arithmetic operation (which occurs after the next train of shift pulses).

The output signal (either "one" or "zero") from the carry flip-flop 65 is applied via line 67 to gate 1.

Also, the output signal of the carry flip-flop 65 is fed back via line 66 to the add/subtract unit 54 to condition the latter for the next arithmetic operation. If this carry signal is a "one" (indicating that the new accumulator number is negative) the next arithmetic operation in unit 54 will be an addition; if it is a "zero" (indicating that the new accumulator number is positive) the next operation will be a subtraction.

At the end of the first train of shift pulses, a test pulse is applied via line 75 to gate 1. This test pulse passes through gate 1 either to line 69 or to line 68. The direction of this pulse through gate 1 depends upon whether the carry flip-flop 65 is in a "one" or a "zero" condition. In the case under discussion, the command pulse is applied to the Y movement line 69.

The pulse on line 69 operates gate 6 to produce a single command pulse, which is applied to the Y servo motor to cause the tool to move a single increment in the Y coordinate direction. The direction (+ or −) of the incremental Y movement is determined by the sign signal on line 171, which controls gate 6.

If the test pulse appears on line 68, it operates gate 7 to send a single X command pulse to the X servo motor. The direction (+ or −) of the X movement of the tool is determined by the sign signal on line 172, which controls gate 7.

If the test pulse appears on line 69 and if gate 2 is open (which depends upon the command signal on line 90), the Y carry flip-flop 82 will be set to "one," and a "carry one" signal will be fed back via line 84 to the add/subtract unit 76. Accordingly, when the next train of shift pulses shifts the original $\underline{Y}$ number out of the $b$ register 50, the number "one" is either added to or subtracted from this $\underline{Y}$ number in unit 76, depending upon the command signal on line 78 or 79 which controls the operation of unit 76.

Similarly, if the test pulse appears on line 68 and if gate 3 is open (which depends upon the command signal on line 89), the X carry flip-flop 86 will be set to "one," and a "carry one" signal will be fed back via line 88 to the add/subtract unit 77. Accordingly, when the next train of shift pulses shifts the original $\underline{X}$ number out of the $a$ register 51, the number "one" is either added to or subtracted from this $\underline{X}$ number, depending upon the command signal on line 80 or 81 which controls the operation of unit 77.

As already stated, gates 2 and 3 are open if the curve to be generated is a circular arc.

If the curve to be generated is a parabola, only one of these gates will be open, depending upon whether the parabola axis is parallel to the X coordinate axis or the Y coordinate axis.

Therefore, whether or not the number in the $b$ register 50 changes by one after each Y command pulse, and whether or not the number in the $a$ register changes by one after each X command pulse, depends upon the type of curve to be generated.

If the curve to be generated is a straight line, both gates 2 and 3 are closed and therefore the number in the $b$ register 50 (which is the ΔX number read in from the tape) and the number in the $a$ register 51 (which is the ΔY number read in from the tape) do not change in response to Y and X command pulses.

Gate 1 also applies to the carry memory flip-flop 71 a signal which depends upon whether the condition of the carry flip-flop 65 is "one" (indicating that the new accumulator number is negative) or "zero" (indicating that the new accumulator number is positive). The carry memory flip-flop 71 applies control signals, via lines 57 and 61, to gate 4 and gate 5 to open one of these gates and close the other. In the example under discussion, if the new accumulator number is negative, the carry memory flip-flop 71 will open gate 4 and close gate 5, so that the next arithmetic operation will be an addition of the Y number (from the $b$ register 50) to the accumulator number; conversely, if the new accumulator number is positive, the carry memory flip-flop 71 will open gate 5 and close gate 4, so that the next arithmetic operation will be a subtraction of the X number (from the $a$ register 51) from the accumulator number.

The test pulse from gate 1, appearing on line 69, is applied to the ΔY carry flip-flop 93, setting this flip-flop to its "one" condition. This takes place after every addition of the Y number to the accumulator number in the add/subtract unit 54, irrespective of whether gate 2 is open or closed. The resulting "carry one" signal from flip-flop 93 conditions the ΔY add/subtract unit 92 to either add or subtract "one" to or from the ΔY number, depending upon whether the control signal for that unit has been applied to the "add Y" line 94 or the "subtract Y" line 95. Accordingly, after each addition of the Y number to the accumulator number in the add/subtract unit 54, the ΔY number stored in the ΔY register 91 will be changed by one.

In like manner, the ΔX number stored in the ΔX register 98 will be changed by one after each subtraction of the X number from the accumulator number in the add/subtract unit 54, as a consequence of the test pulse appearing on the output line 68 from gate 1. Also, the X number stored in the $a$ register 51 will change by one after such subtraction if gate 3 is open.

Each successive train of shift pulses will produce either an addition of the Y number to the accumulator number in the add/subtract unit 54 or a subtraction of the X number from that accumulator number. The new accumulator number is fed back to the accumulator 52 and its sign, positive or negative, determines whether the next arithmetic operation (following the next train of shift pulses) will be an addition of the Y number or a subtraction of the X number.

For the curve under consideration, each test pulse which follows a train of shift pulses will:

(1) produce a single increment of movement of the tool parallel to the X or Y coordinate axis, depending upon whether the preceding arithmetic operation involved the Y number or the X number;

(2) change by one either the ΔY number in register 91 or the ΔX number in register 98; and (3) depending upon the type of curve being generated, change by one, or not, the Y number in register 50 or the X number in register 51.

After the required number of tool movements parallel to the X and Y coordinate axes have taken place, the ΔY number in register 91 will be zero and the ΔX number in the ΔX register 98 will be zero. These conditions are sensed by the zero-test devices 96 and 103. These devices now apply signals to the lines labelled "ΔY=0" and "ΔX=0" in FIGS. 16b and 16a. These zero-test signals are applied to the sign modification logic block 173, which produces an "end of curve" signal on line 36 (FIG. 16a). This "end of curve" signal causes the control circuit 160 to discontinue the curve generating operation and to start the next tape reading operation, wherein the parameters of the next curve section to be generated are read in. Following this, that next curve section then is generated by the tool.

While a presently-preferred embodiment of this invention has been described in detail and shown in the accompanying drawings, it is to be understood that various modifications, omissions and refinements which depart from the disclosed embodiment may be adopted without departing from the spirit and scope of this invention. For example, the present curve generator may be used for purposes other than the control of a machine tool.

What is claimed is:

1. In a numerical curve generator, means for storing two numbers whose ratio substantially represents the instantaneous slope of the curve to be generated, and an arithmetic unit having an accumulated number stored therein, means for selectively adding one of said first-mentioned numbers to said accumulated number or subtracting the other of said first-mentioned numbers from said accumulated number, depending upon the sign of said accumulated number, and means for storing the number which results from said addition or subtraction as the new accumulated number in said arithmetic unit.

2. In a numerical curve generator, means for producing two separate numbers whose ratio substantially represents the instantaneous slope of the curve to be generated, and an arithmetic unit comprising an accumulator for storing an accumulated number, an add/subtract unit operable selectively either to add one of said first-mentioned numbers to said accumulated number if said accumulated number is negative or to subtract the other of said first-mentioned numbers from said accumulated number if said accumulated number is positive, and means for feeding back to said accumulator, as the new accumulated number, the number which results from said addition or subtraction in said add/subtract unit.

3. In a numerical curve generator, two separate registers for storing respectively two numbers whose ratio determines the instantaneous slope of the curve to be generated, an accumulator for storing an accumulated number, an add/subtract unit coupled to said accumulator and said registers and operable either to add one of said register numbers to said accumulated number when the latter is negative or to subtract the other of said register numbers from said accumulated number when the latter is positive, feedback means between said add/subtract unit and said accumulator for feeding back to said accumulator, as the new accumulated number, the number which results from said addition or subtraction in the add/subtract unit, and output means responsive to the addition or subtraction operation in said add/subtract unit.

4. In a numerical curve generator, two separate registers for storing respectively two numbers whose ratio determines the instantaneous slope of the curve to be generated, an accumulator for storing an accumulated number, an add/subtract unit coupled to said accumulator and to said registers, means for causing said add/subtract unit to add one of said register numbers to said accumulated number when the latter is negative, means for causing said add/subtract unit to subtract the other of said register numbers from said accumulated number when the latter is positive, feedback means connected between said add/subtract unit and said accumulator for feeding back to the latter, as the new accumulated number, the number which results from said addition or subtraction in the add/subtract unit, and output means coupled to said add/subtract unit and operative selectively depending upon whether the preceding operation in said add/subtract unit was an addition or a subtraction.

5. In a numerical curve generator, two separate registers for storing respectively two numbers whose ratio determines the instantaneous slope of the curve to be generated, an accumulator for storing an accumulated number, an add/subtract unit coupled to said accumulator and to said registers, means for causing said add/subtract unit to add one of said register numbers to said accumulated number when the latter is negative, means for causing said add/subtract unit to subtract the other of said register numbers from said accumulated number when the latter is positive, feedback means connected between said add/subtract unit and said accumulator for feeding back to the latter, as the new accumulated number, the number which results from said addition or subtraction in the add/subtract unit, means coupled to said add/subtract unit and operative to sense whether the preceding operation in said add/subtract unit was an addition or a subtraction, a first output line coupled to said last-mentioned means to pass an output signal when the preceding operation in said add/subtract unit was an addition, and a second output line coupled to said last-mentioned means to pass an output signal when the preceding operation in said add/subtract unit was a subtraction.

6. In a numerical curve generator, two separate registers for storing respectively two numbers whose ratio determines the instantaneous slope of the curve to be generated, an accumulator for storing an accumulated number, an add/subtract unit coupled to said accumulator and to said registers, means for causing said add/subtract unit to add one of said register numbers to said accumulated number when the latter is negative, means for causing said add/subtract unit to subtract the other of said register numbers from said accumulated number when the latter is positive, feedback means connected between said add/subtract unit and said accumulator for feeding back to the latter, as the new accumulated number, the number which results from said addition or subtraction in the add/subtract unit, output means coupled to said add/subtract unit and operative selectively depending upon whether the operation in said add/subtract unit is an addition or a subtraction, means for modifying either of register numbers in accordance with the preceding addition or subtraction operation in said add/subtract unit, and means for selectively disabling said last-mentioned means in accordance with the type of curve being generated.

7. In a numerical curve generator, two separate registers for storing respectively two numbers whose ratio determines the instantaneous slope of the curve to be generated, an accumulator for storing an accumulated number, an add/subtract unit coupled to said accumulator and to said registers, means for causing said add/subtract unit to add one of said register numbers to said accumulated number when the latter is negative, means for causing said add/subtract unit to subtract the other of said register numbers from said accumulated number when the latter is positive, feedback means connected between said add/subtract unit and said accumulator for feeding back to the latter, as the new accumulated number, the number which results from said addition or subtraction in the add/subtract unit, means coupled to said add/subtract unit and operative selectively depending upon whether the preceding operation in said add/subtract unit was an addition or a subtraction, a first output line coupled to said last-mentioned means for passing an output signal when the preceding operation in said add/subtract unit was an addition, a second output line coupled to said last-mentioned means for passing an output signal when the preceding operation in said add/subtract unit was a subtraction, a first modifying means operative to change by "one" the number in one of said registers in response to a signal in said first output line, a second modifying means operative to change by "one" the number in the other of said registers in response to a signal in said second output line, and means for selectively disabling said first and second modifying means in accordance with the type of curve to be generated.

8. The curve generator of claim 7 wherein said last-mentioned means disables both said first and second modifying means when the curve to be generated is a straight line.

9. The curve generator of claim 7 wherein said last-mentioned means maintains both said first and second modifying means operative when the curve to be generated is a circular arc.

10. The curve generator of claim 7 wherein said last-mentioned means disables one of said modifying means and maintains the other of said modifying means operative when the curve to be generated is a parabolic curve.

11. In a numerical curve generator, two separate registers for storing respectively two numbers whose ratio determines the instantaneous slope of the curve to be generated, an accumulator for storing an accumulated number, an add/subtract unit coupled to said accumulator and to said registers, means for causing said add/subtract unit to add one of said register numbers to said accumulated number when the latter is negative, means for causing said add/subtract unit to subtract the other of said register numbers from said accumulated number when the latter is positive, feedback means connected between said add/subtract unit and said accumulator for feeding back to the latter, as the new accumulated number, the number which results from said addition or subtraction in the add/subtract unit, output means coupled to said add/substract unit and operative selectively depending upon whether the operation in said add/subtract unit is an addition or a subtraction, and means responsive to said addition and subtraction operations for sensing the end point of the curve to be generated.

12. In a numerical curve generator, two separate registers for storing respectively two numbers whose ratio determines the instantaneous slope of the curve to be generated, an accumulator for storing an accumulated number, an add/subtract unit coupled to said accumulator and to said registers, means for causing said add/subtract unit to add one of said register numbers to said accumulated number when the latter is negative, means for causing said add/subtract unit to subtract the other of said register numbers from said accumulated number when the latter is positive, feedback means connected between said add/subtract unit and said accumulator for feeding back to the latter, as the new accumulated number, the number which results from said addition or subtraction in the add/subtract unit, means coupled to said add/subtract unit and operative selectively depending upon whether the operation in said add/subtract unit is an addition or a subtraction, a pair of output lines coupled to said last-mentioned means for respectively passing an output signal in response to each addition or subtraction operation in said add/subtract unit, a ΔX register for storing a number representing the X coordinate distance to the end point of the curve to be generated, means for changing the number in said ΔX register in response to each signal in one of said output lines, a ΔY register for storing a number representing the Y coordinate distance to the end point of the curve to be generated, and means for changing the number in said ΔY register in response to each signal in the other of said output lines.

13. A straight line generator comprising a first register for storing a number representing the X coordinate distance from the starting point to the end point of the line to be generated, a second register for storing a number representing the Y coordinate distance from the starting point to the end point of the line to be generated, an accumulator for storing an accumulated number, an add/subtract unit coupled to said accumulator and to said registers, means for causing said add/subtract unit to add one of said register numbers to said accumulated number when the latter is negative, means for producing an increment of the line in one coordinate direction in response to each addition operation in said add/subtract unit, means for causing said add/subtract unit to subtract the number in the other of said registers from said accumulated number when the latter is positive, means for producing an increment of the line in the other coordinate direction in response to each subtraction in said add/subtract unit, feedback means connected between said add/subtract unit and said accumulator and operative after each addition or subtraction operation in said add/subtract unit to feed back to the latter, as the new accumulated number, the number which results from said addition or subtraction operation in the add/subtract unit, and means for discontinuing said addition and subtraction operations in said add/subtract unit when the end point of said line is reached.

14. A circular curve generator comprising a first register for initially storing a number representing the X coordinate distance from the starting point of the curve to be generated to the center of the circle, a second register for initially storing a number representing the Y coordinate distance from the starting point of the curve to the center of the circle, an accumulator for storing an accumulated number, an add/subtract unit coupled to said accumulator and to said registers, means for causing said add/subtract unit to add one of said register numbers to said accumulated number when the latter is negative, means for producing an increment of the curve in one coordinate direction in response to each addition operation in said add/subtract unit, means for modifying the number in the corresponding register after each addition operation in the add/subtract unit, means for causing said add/subtract unit to subtract the other of said register numbers from said accumulated number when the latter is positive, means for producing an increment of the curve in the other coordinate direction in response to each subtraction operation in said add/subtract unit, means for modifying the number in said other register after each subtraction in the add/subtract unit, feedback means connected between said add/subtract unit and said accumulator and operative after each addition or subtraction operation in said add/subtract unit to feed back to the accumulator, as the new accumulated number, the number which results from said addition or subtraction operation in the add/subtract unit, and means for discontinuing the addition and subtraction operations in said add/subtract unit when the end point of said curve is reached.

15. A curve generator for generating a parabolic curve having its axis parallel to an X or Y coordinate axis, said curve generator comprising a first register for initially storing a number representing the coordinate distance from the starting point of the curve to be generated to the parabola axis, a second register for initially storing a number representing the other coordinate distance from said starting point to the vertex of the parabola, an accumulator for storing an accumulated number, an add/subtract unit coupled to said accumulator and to said registers, means for causing said add/subtract unit to add one of said register numbers to said accumulated number when the latter is negative, means for producing an increment of the curve in one coordinate direction in response to each addition operation in said add/subtract unit, means for causing the add/subtract unit to subtract the other of said register numbers from said accumulated number when the latter is positive, means for producing an increment of the curve in the other coordinate direction in response to each subtraction operation in said add/subtract unit, feedback means connected between said add/subtract unit and said accumulator and operative after each addition or subtraction operation in said add/subtract unit to feed back to the accumulator, as the new accumulated number, the number which results from said addition or subtraction operation, means for changing the number stored in said second register in response to the generation of each increment of the curve in the other coordinate direction, means for restoring the initial number in said first register after each addition or subtraction operation, and means for discontinuing the addition and subtraction operations in said add/subtract unit when the end point of the curve is reached.

16. In a numerical curve generator, means providing two numbers whose quotient substantially represents the instantaneous slope of the curve to be generated, an accumulator having an accumulated number stored therein, means operable in response to the value of said accumulated number either to add one of said first-mentioned numbers to said accumulated number when the latter is below a predetermined value or to subtract the other of said first-mentioned numbers from said accumulated number when the latter is above said predetermined value, and means for recirculating back to the accumulator after each addition or subtraction the new accumulated number which results from said addition or subtraction.

17. In a numerical curve generator for generating a conic section curve, means providing two numbers whose quotient substantially equals the instantaneous slope of the curve to be generated, an accumulator having an accumulated number stored therein, means operable repeatedly to add one of said first-mentioned numbers to said accumulated number when the latter is negative or to subtract the other of said first-mentioned numbers from said accumulated number when the latter is positive, means for feeding back to the accumulator the new accumulated number which results from said addition or subtraction, and means for repeatedly modifying at least one said first-mentioned numbers throughout the generattion of said curve in accordance with the differential equation of said curve to compensate for the changing slope of the curve along its length.

References Cited by the Examiner

UNITED STATES PATENTS

| | | | |
|---|---|---|---|
| 2,803,401 | 8/1957 | Nelson | 235—175 |
| 2,808,650 | 10/1957 | Kumagai | 235—168 X |
| 2,833,941 | 5/1958 | Rosenberg et al. | |
| 2,887,638 | 5/1959 | Cail et al. | 318—39 |
| 3,021,069 | 2/1962 | Rowley et al. | 235—168 |
| 3,022,949 | 2/1962 | Steele | 235—152 |
| 3,033,459 | 5/1962 | Saylor | 235—168 |
| 3,069,608 | 12/1962 | Forrester et al. | 318—162 |
| 3,079,522 | 2/1963 | McGarrell | 235—151 X |

MALCOLM A. MORRISON, *Primary Examiner.*

L. PEAR, ROBERT C. BAILEY, *Examiners.*

L. B. TAYLOR, T. M. ZIMMER, M. J. SPIVAK,
*Assistant Examiners.*